(12) United States Patent
Zhang et al.

(10) Patent No.: US 11,177,909 B2
(45) Date of Patent: Nov. 16, 2021

(54) METHODS AND APPARATUS RELATED TO ACK/NACK FEEDBACK WITH MULTI-TRP TRANSMISSIONS

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/258,265

(22) Filed: Jan. 25, 2019

(65) Prior Publication Data
US 2019/0342035 A1 Nov. 7, 2019

Related U.S. Application Data

(60) Provisional application No. 62/667,188, filed on May 4, 2018.

(51) Int. Cl.
| H04L 1/16 | (2006.01) |
| H04L 5/00 | (2006.01) |
| H04L 1/00 | (2006.01) |

(52) U.S. Cl.
CPC .......... *H04L 1/1621* (2013.01); *H04L 1/0073* (2013.01); *H04L 1/0081* (2013.01); *H04L 1/1671* (2013.01); *H04L 5/0055* (2013.01)

(58) Field of Classification Search
CPC ... H04L 1/1621; H04L 5/0055; H04L 1/0081; H04L 1/0073; H04L 1/1671;
(Continued)

(56) References Cited

U.S. PATENT DOCUMENTS 8,553,671 B2 * 10/2013 Kim ................. H04J 13/16
370/344
8,879,512 B2 * 11/2014 Sugawara ............. H04L 1/1887
370/335
(Continued)

FOREIGN PATENT DOCUMENTS

WO    2017052345 A1    3/2017
WO    WO-2018228487 A1 *  12/2018  ........... H04L 1/1854

OTHER PUBLICATIONS

Asustek: "Discussion on Multi-TRP DL Transmission", 3GPP Draft; R1-1716546 Discussion on Multi-TRP DL Transmission, 3rd Generation Partnership Project (3GPP), Mobile Competence Centre ; 650, Route Des Lucioles ; F-06921 Sophia-Antipolis Cedex ; France, vol. RAN WG1, No. Nagoya, Japan; Sep. 18, 2017-Sep. 21, 2017, Sep. 17, 2017 (Sep. 17, 2017), XP051339999, 3 Pages, Retrieved from the Internet: URL:http://www.3gpp.org/ftp/Meetings_3GPP_SYNC/RAN1/Docs/ [retrieved on Sep. 17, 2017], Section 2.
(Continued)

*Primary Examiner* — Albert Decady
*Assistant Examiner* — Enam Ahmed
(74) *Attorney, Agent, or Firm* — Changwoo Yang

(57) ABSTRACT

Various aspects related to ACK/NACK feedback for multi-TRP transmission scenarios are described. A base station, may send, to a UE, information indicating PDCCH monitoring occasions for each of a plurality of TRPs. In one aspect, the base station may send information indicating whether ACK/NACK feedback across the plurality of TRPs is allowed. The base station may send rules to the UE for performing ACK/NACK feedback bundling for providing feedback to the plurality of TRPs. The base station may also send information indicating a DAI definition for interpreting DAIs transmitted by the plurality of TRPs in corresponding PDCCH transmissions indicating whether the DAIs are independent or joint. The base station may receive a joint
(Continued)

ACK/NACK feedback from the UE in a PUCCH based on the rules, or may receive multiple ACK/NACK feedback from the UE in a PUCCH for a first TRP independent from a second TRP.

30 Claims, 14 Drawing Sheets

(58) Field of Classification Search
CPC ... H04L 1/0025; H04L 1/1607; H04L 1/1854; H04L 1/1887; H04L 1/189; H04L 1/1896; H04L 1/08; H04L 1/242; H04L 69/324; H04L 43/106; H04L 1/0061; H04L 5/001; H04L 5/0035; H04L 5/0023; H04L 5/0091; H04L 5/0053
USPC .......................................................... 714/748
See application file for complete search history.

(56) References Cited

U.S. PATENT DOCUMENTS

| | | | | |
|---|---|---|---|---|
| 8,971,177 | B1* | 3/2015 | Hsiao | H04L 1/1848 370/218 |
| 9,025,547 | B2* | 5/2015 | Ko | H04L 1/1822 370/329 |
| 10,735,160 | B2* | 8/2020 | He | H04W 72/042 |
| 2009/0238128 | A1* | 9/2009 | Park | H04L 1/18 370/329 |
| 2009/0300456 | A1* | 12/2009 | Pelletier | H04L 1/1822 714/749 |
| 2013/0194980 | A1* | 8/2013 | Yin | H04L 1/1607 370/280 |
| 2013/0242824 | A1* | 9/2013 | Lee | H04W 72/0446 370/281 |
| 2014/0050148 | A1 | 2/2014 | Choi | |
| 2017/0195089 | A1 | 7/2017 | Lee et al. | |
| 2018/0027537 | A1* | 1/2018 | Yang | H04L 5/001 370/329 |
| 2018/0310257 | A1* | 10/2018 | Papasakellariou | H04W 72/1289 |
| 2020/0008225 | A1* | 1/2020 | Lee | H04L 5/0091 |
| 2020/0077470 | A1* | 3/2020 | Xiong | H04L 1/1854 |

OTHER PUBLICATIONS

Huawei et al., "Discussion on Multi-TRP Cooperation for URLLC", 3GPP TSG RAN WG1 Meeting #92, 3GPP Draft; R1-1802716, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 26, 2018-Mar. 2, 2018, Feb. 17, 2018 (Feb. 17, 2018), XP051398149, 5 Pages, Retrieved from the Internet: URL:http://www.3gpp.org/ftp/tsg%5Fran/WG1%5FRL1/TSGR1%5F92/Docs/ [retrieved on Feb. 17, 2018], Section 2.
Partial International Search Report—PCT/US2019/019618—ISA/EPO—dated May 28, 2019.
International Search Report and Written Opinion—PCT/US2019/019618—ISA/EPO—dated Aug. 1, 2019.
VIVO: "Discussion on Multi PDCCH based Multi TRP Transmission", 3GPP Draft; R1-1900137_Discussion on Multi PDCCH based Multi TRP Transmission_Final, 3rd Generation Partnership Project (3GPP), Mobile Competence Centre ; 650, Route Des Lucioles ; F-06921 Sophia-Antipolis Cedex ; France, vol. RAN WG1, No. Taipei; Jan. 21, 2019-Jan. 25, 2019 Jan. 12, 2019, XP051575761, Retrieved from the Internet: URL:http://www.3gpp.org/ftp/tsg%5Fran/WG1%5FRL1/TSGR1%5FAH/NR%5FAH%5F1901/Docs/R1%2D1900137%2Ezip [retrieved on Jan. 12, 2019], section 5, 15 pages.
VIVO: "Further Discussion on Multi-TRP Transmission", 3GPP Draft; R1-1901702_Further Discussion on Multi-TRP Transmission_V5, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 25, 2019-Mar. 1, 2019 Feb. 15, 2019, XP051599398, Retrieved from the Internet: URL:http://www.3gpp.org/ftp/tsg%5Fran/WG1%5FRL1/TSGR1%5F96/Docs/R1%2D1901702%2Ezip [retrieved on Feb. 15, 2019], section 5, 14 pages.

\* cited by examiner

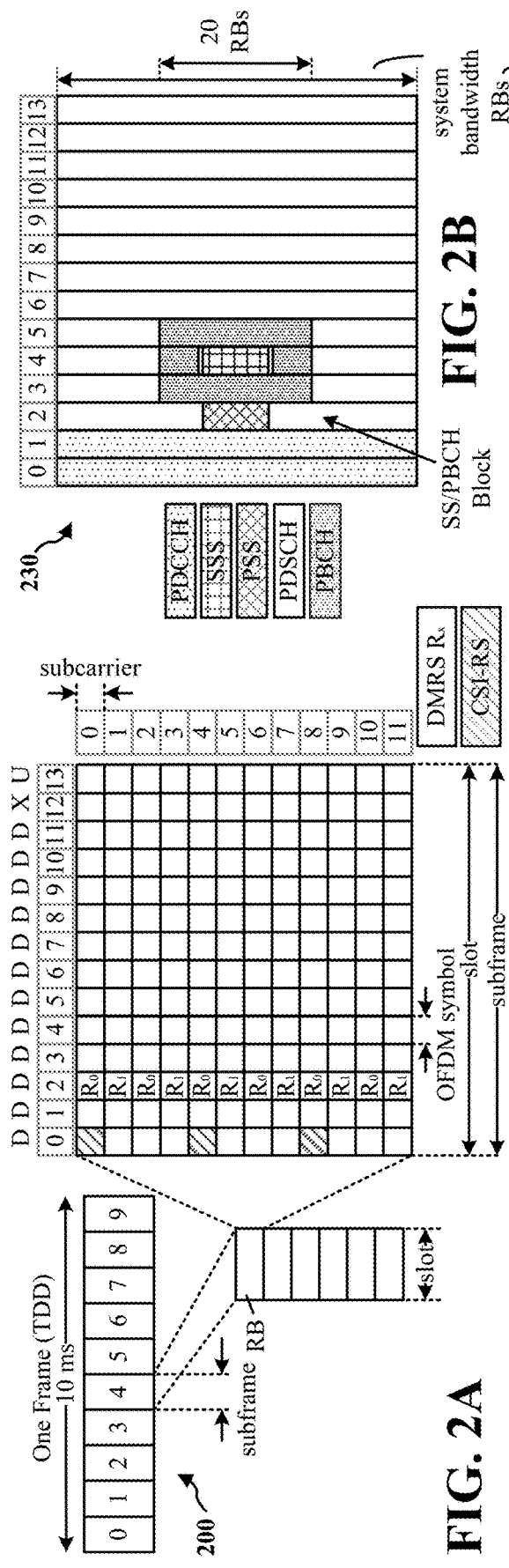
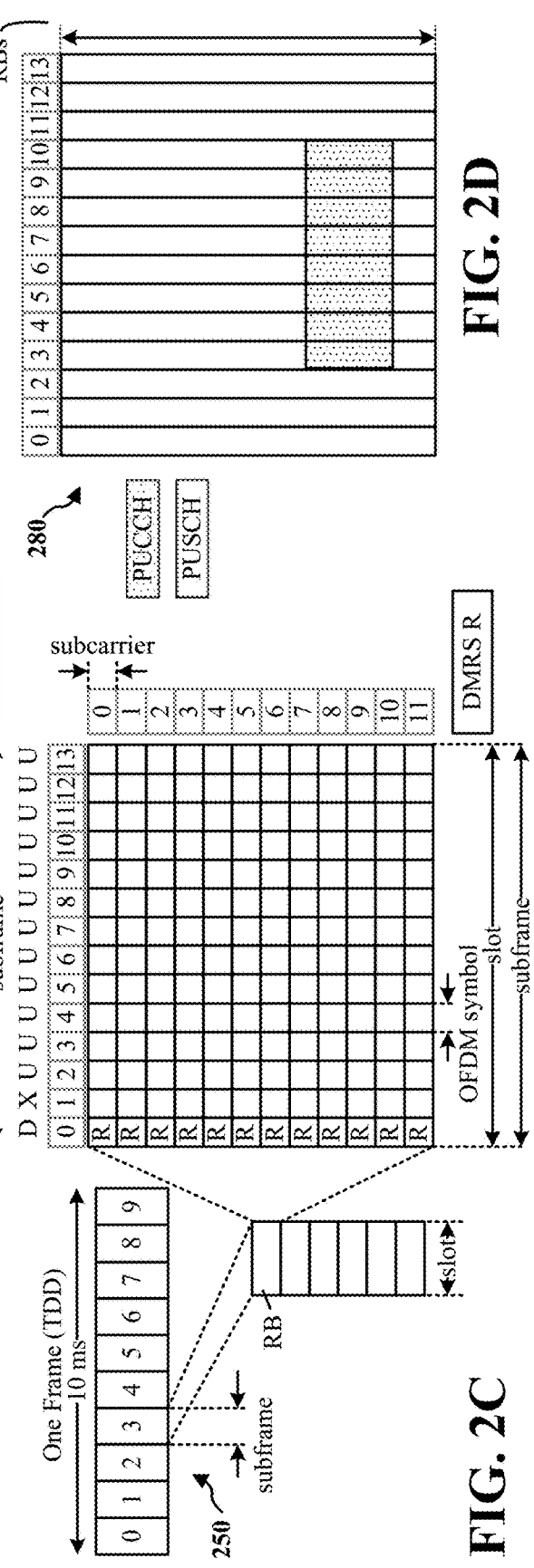
FIG. 2A  FIG. 2B  FIG. 2C  FIG. 2D

METHODS AND APPARATUS RELATED TO ACK/NACK FEEDBACK WITH MULTI-TRP TRANSMISSIONS

CROSS-REFERENCE TO RELATED APPLICATIONS

This application claims the benefit of U.S. Provisional Application Ser. No. 62/667,188, entitled "METHODS AND APPARATUS RELATED TO ACK/NACK FEEDBACK WITH MULTI-TRP TRANSMISSIONS" and filed on May 4, 2018, which is expressly incorporated by reference herein in its entirety.

BACKGROUND

Technical Field

The present disclosure relates generally to communication systems, and more particularly, to methods and apparatus related to providing acknowledgement (ACK)/negative ACK (NACK) in a wireless network including multiple transmission reception points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of NR may be based on the Long Term Evolution (LTE) standard. There exists a need for further improvements in NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus, e.g., a base station, may be configured to send, to a user equipment (UE), information indicating physical downlink control channel (PDCCH) monitoring occasions for each of a plurality of transmission reception points (TRPs). In one aspect, the apparatus may be further configured to send information indicating whether ACK/NACK feedback across the plurality of TRPs is allowed. The apparatus may be further configured to send, when ACK/NACK feedback across the plurality of TRPs is allowed, information indicating rules for performing ACK/NACK feedback bundling for providing feedback to the plurality of TRPs. The apparatus may also be configured to send information indicating a DAI definition for interpreting DAIs transmitted by the plurality of TRPs in corresponding PDCCH transmissions, where the definition indicates whether each of the DAIs transmitted by the plurality of TRPs is an independent DAI. In one configuration, the apparatus may receive a joint ACK/NACK feedback from the UE in a PUCCH based on the rules. In another configuration, the apparatus may receive multiple ACK/NACK feedback from the UE in a physical uplink control channel (PUCCH) for a first TRP independent from a second TRP.

In another aspect of the disclosure, a method, a computer-readable medium, and an apparatus are provided. The apparatus, e.g., a UE, may be configured to receive information indicating PDCCH monitoring occasions for each of a plurality of TRPs. In one aspect, the apparatus may be further configured to receive information indicating whether ACK/NACK feedback across the plurality of TRPs is allowed. In one configurations, the apparatus may be further configured to receive, when ACK/NACK feedback across the plurality of TRPs is allowed, information indicating rules for performing ACK/NACK feedback bundling at the UE for providing feedback to the plurality of TRPs. The apparatus may also be configured to receive information indicating a DAI definition for interpreting DAIs transmitted by the plurality of TRPs in corresponding DCIs, where the definition indicates whether each of the DAIs transmitted by the plurality of TRPs is an independent DAI. The apparatus may be further configured to transmit a joint ACK/NACK feedback in a PUCCH having a determined codebook size and based on the rules. The apparatus may be also configured to transmit multiple ACK/NACK feedback in a PUCCH individually to a first TRP and to a second TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
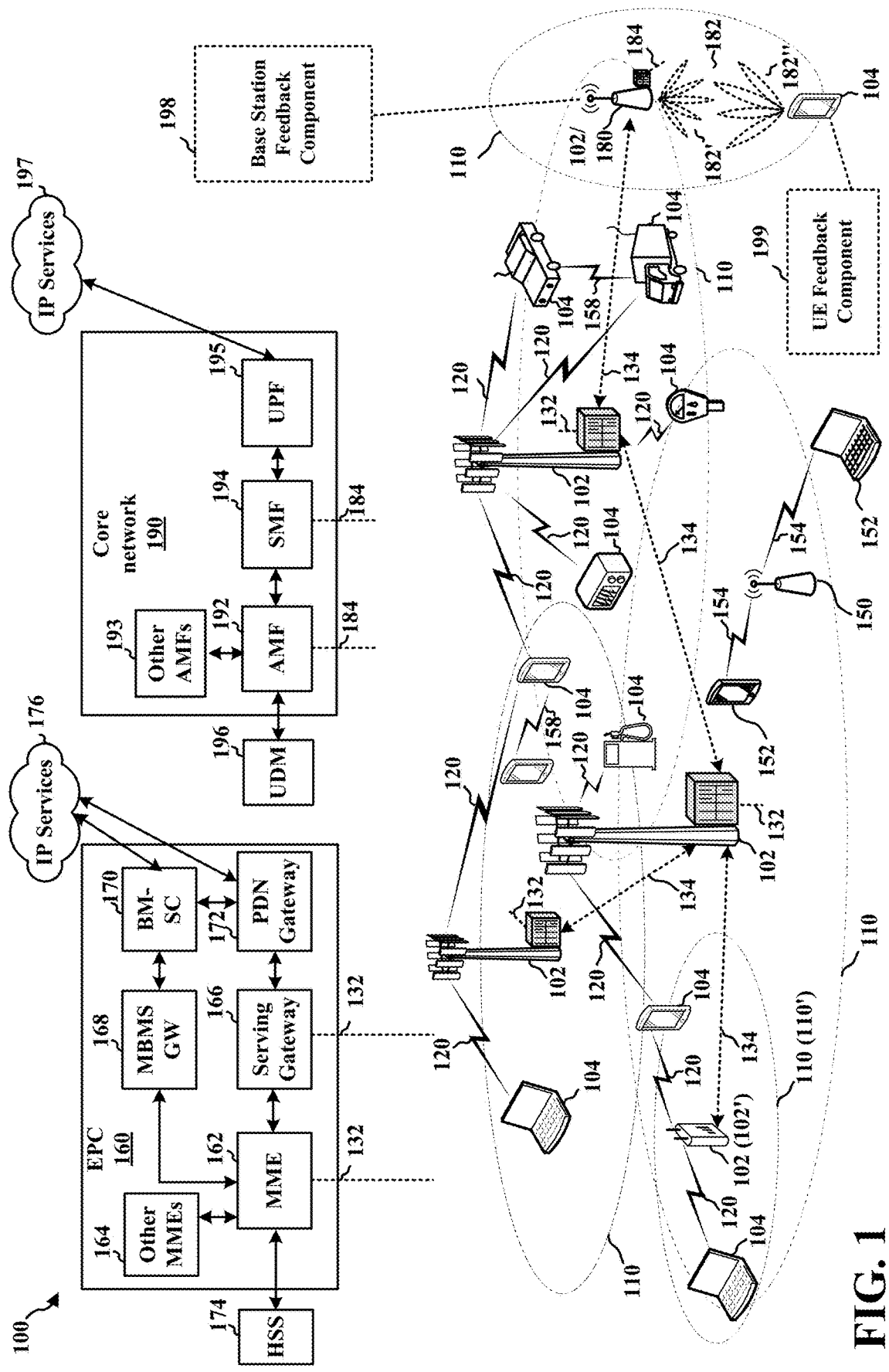
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190, e.g., a 5G Core (5GC). The base stations 102 may include macro cells (high power cellular base station) and/or small cells (low power cellular base station). The macro cells include base stations. The small cells include femtocells, picocells, and microcells.

The base stations 102 may be configured for LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the wireless communications system may include multiple TRPs (e.g., such as base stations or access points) that may communicate with the UE 104. In certain aspects, the base station (e.g., gNB) 180 may be the serving base station in a cell including the multiple TRPs and the UE 104. In one such aspect, the base station 180 may include a base station feedback component 198 configured to send, to the UE 104, information indicating PDCCH monitoring occasions for each of the plurality of TRPs and information indicating whether ACK/NACK feedback across the plurality of TRPs is allowed. In some configurations, the base station feedback component 198 may be configured to also send rules indicating how to perform ACK/NACK feedback bundling for providing feedback to the plurality of TRPs. The base station feedback component 198 may also be configured to send information indicating a DAI definition for interpreting DAIs transmitted by the plurality of TRPs in corresponding PDCCH transmissions, where the definition indicates whether each of the DAIs transmitted by the plurality of TRPs is an independent DAI.

In certain aspects, the UE 104 may include a UE feedback component 199 configured to receive configuration on PDCCH monitoring occasions for each of the plurality of TRPs and information indicating whether ACK/NACK feedback across the plurality of TRPs is allowed. In some configurations, the UE feedback component 199 may be configured to receive rules for performing ACK/NACK feedback bundling across the plurality of TRPs, to determine an ACK/NACK codebook size, and to transmit a joint ACK/NACK feedback in a PUCCH based on the rules. The UE feedback component 199 may be also configured to transmit multiple ACK/NACK feedback in a PUCCH individually to a first TRP and to a second TRP. The UE feedback component 199 may be further configured to receive information indicating a DAI definition for interpreting DAIs transmitted by the plurality of TRPs in corresponding DCIs, where the definition indicates whether each of the DAIs transmitted by the plurality of TRPs is an independent DAI. Various additional aspects and details of the disclosed methods and apparatus are discussed infra with respect to FIGS. 5-14.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

s illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
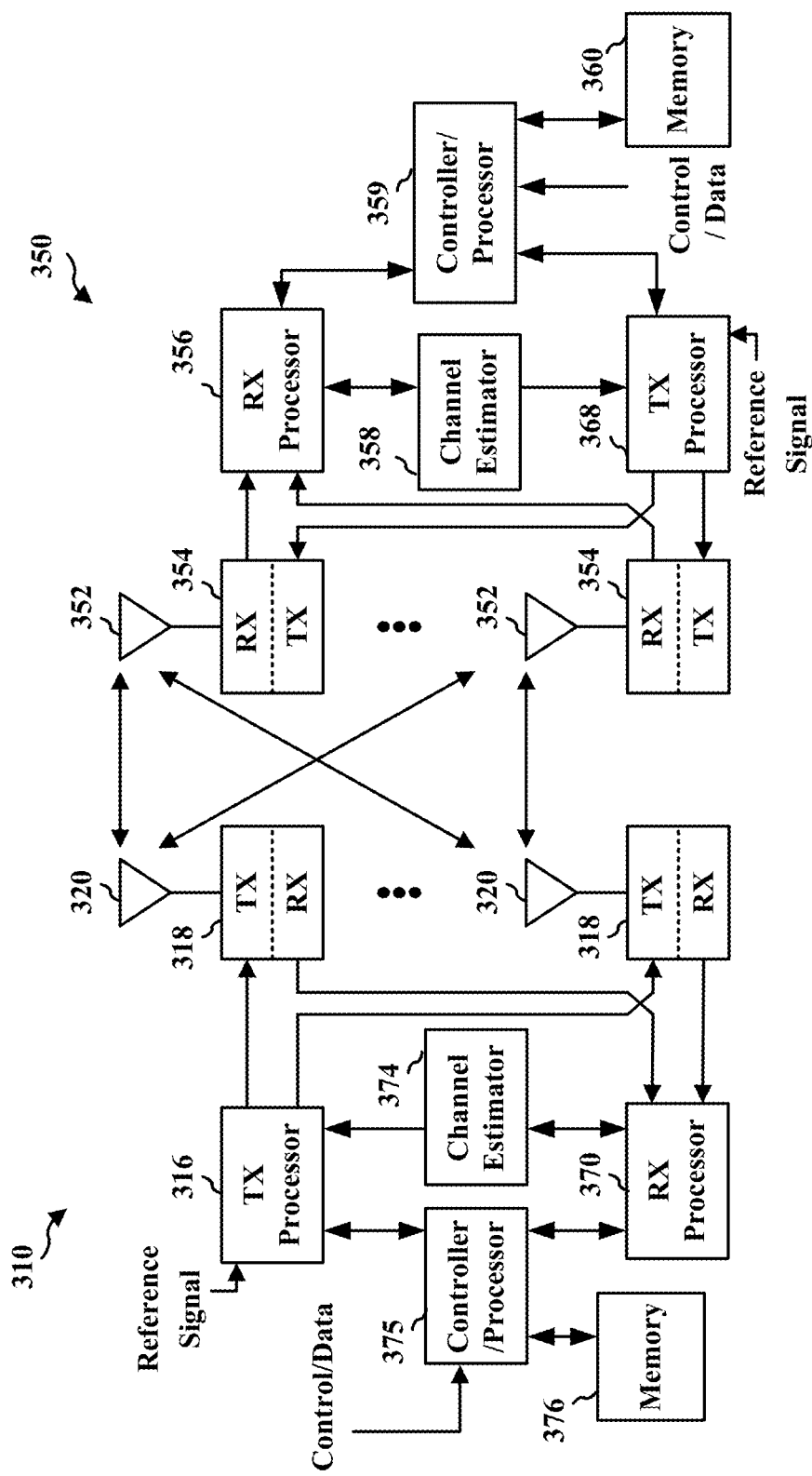
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In systems supporting NR protocol, a UE may receive transmissions from multiple TRPs at the same time. The TRPs may be collocated, or distributed, or associated with different cells. In NR systems, multi-TRP transmission in DL may support two modes. In a first mode (mode 1), a single DCI may grant a single transport block (TB). That is, a single control channel may schedule a single downlink TB. Different spatial layers in a TB may be transmitted from different (e.g., two) TRPs. For example, layer 1 corresponding to a TB may be from a first TRP and layer 2 corresponding to the TB may be from a second TRP.

In a second mode (mode 2), multiple DCIs may be transmitted with each DCI granting one TB, where each TB may come from one TRP. For example, one DCI grant may from one TRP and another DCI grant may come from another TRP. In another example, a UE may receive two DCIs from a first TRP, but out of the two, one DCI may carry the grant from the first TRP while the other DCI may carry the grant from another (second) TRP. Thus, multiple DCIs may come from the same TRP or different TRPs. The multiple DCIs (whether from same or different TRPs) may indicate different timelines (k0 and k1), e.g., indicating timing between transmission of DCI and data (k0), and timing between reception of data (e.g., at UE) and transmission of a corresponding ACK/NACK (k1). Each DCI may indicate the two timings. In the case of multiple DCIs and multiple TRPs, the timings indicated in the multiple DCIs may be the same or different. Furthermore, the multiple TBs associated with multiple DCIs may correspond to different payload or same payload with potentially different redundancy version index (RVIDs). While the current ACK/NACK feedback mechanism in NR may work well for mode 1, given the various possible scenarios associated with multiple DCI grants and multiple TRPs in mode 2, determining the impact on ACK/NACK feedback due to the introduction of multiple DCIs in mode 2 may be of interest.

Figure 4:
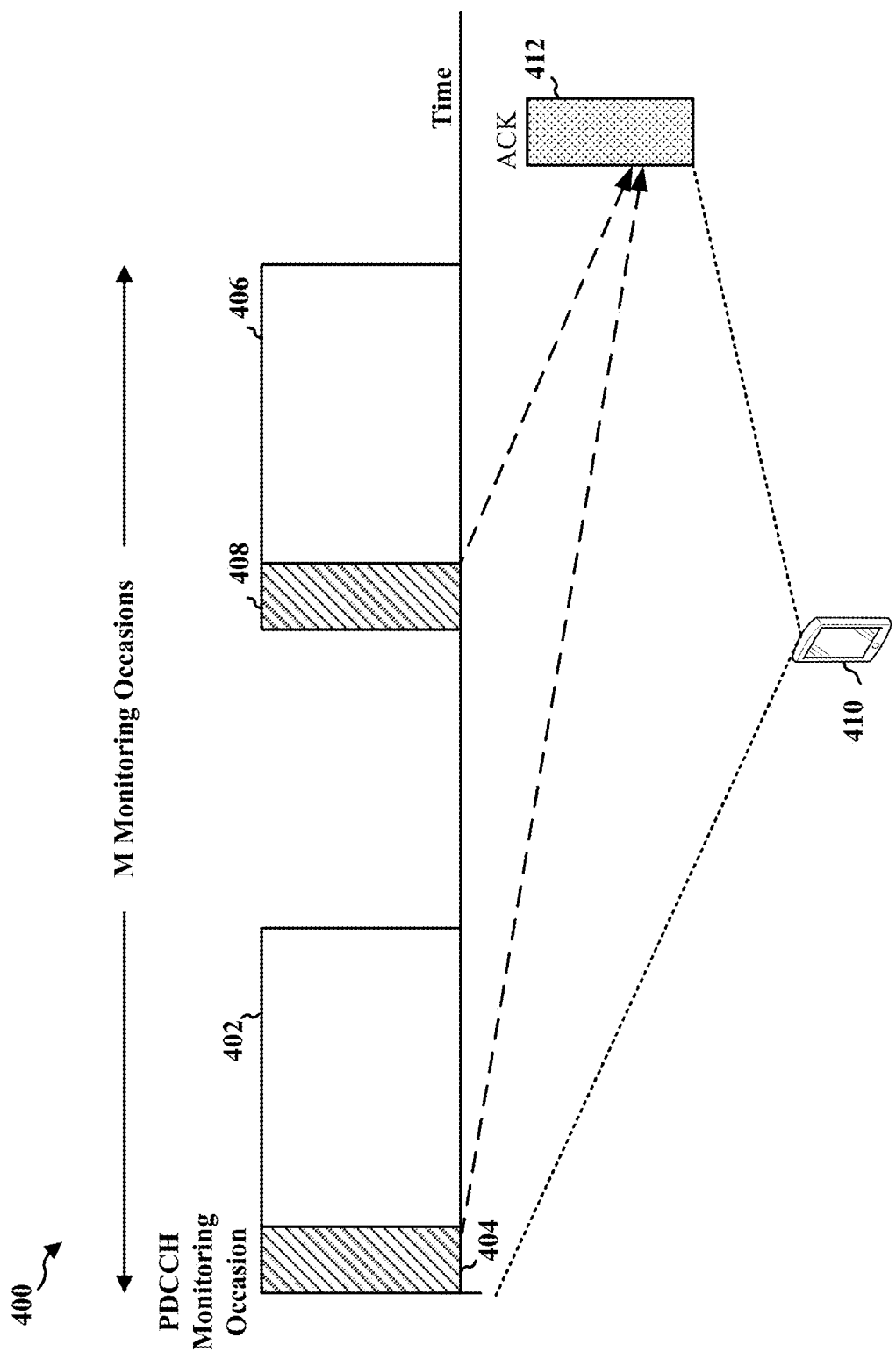
FIG. 4 illustrates a diagram depicting an example where two PDCCH monitoring occasions may correspond to the same ACK/NACK reporting instance.

When a UE receives a DCI grant and DL data, the UE may need to send back a corresponding ACK/NACK. As discussed above, the UE may also receive, in the DCI, an indication of the timeline for sending back an ACK/NACK feedback. The timeline may indicate when the UE is supposed to send back the ACK/NACK feedback. In NR, an ACK/NACK codebook may be semi-static (e.g., type 1) or dynamic (e.g., type 2). A HARQ codebook may be associated with codebook size (e.g., the ACK/NACK payload size). In an aspect, the UE may first determine an ACK/NACK codebook size prior to sending an ACK/NACK feedback, e.g., in response to received one or more TBs. In one example, for determining an ACK codebook size for a type 1 HARQ codebook, the UE may consider potential transmissions in various PDCCH monitoring occasions (even if the UE does not receive a grant in all of the monitoring occasions) which could correspond to the same ACK/NACK reporting instance. For instance, consider one example case with reference to FIG. 4 which illustrates a diagram 400 depicting two monitoring occasions which correspond to the same ACK/NACK reporting instance. The first monitoring occasion 404 may be at a first slot 402 and the second monitoring occasion 408 may be at a second slot 406. When the UE 410 determines that both of the PDCCH monitoring occasions correspond to the same reporting instance (e.g., based on timing values indicated in the corresponding DCIs), the UE 410 may determine that the size of the ACK/NACK codebook should be sufficient enough to give feedback for 2 TBs corresponding to the two PDCCH monitoring occasions 404 and 408. Accordingly, in this particular example, the ACK/NACK codebook size may be, e.g., 2 bits, where 1 bit may be for the TB associated with the first monitoring occasion 404 and the other 1 bit for the TB associated with the second monitoring occasion 408. Assuming that the ACK/NACK feedback to be transmitted in this example is an ACK, the UE 410 may transmit ACK 412 acknowledging both TBs.

In one aspect, to determine an ACK/NACK payload size, the UE 410 may determine a number M of PDCCH monitoring occasion(s) based on maximum and minimum slot timing values provided to the UE 410 by a higher layer parameter downlink data to downlink acknowledgment (DL-data-DL-acknowledgement), and on a number of possible slot timing values. The determination for the number M of PDCCH monitoring occasion(s) may be further based on the PDCCH monitoring periodicity, the PDCCH monitoring offset, and the PDCCH monitoring pattern within a slot for each control resource set in a set of control resource sets configured to the UE. Thus, the UE 410 may determine an ACK/NACK payload size based on RRC configuration (e.g., indicating whether the UE may need to spatial-bundling in case the UE may be scheduled to get more than one TB), and timing information (e.g., slot timing values) provided by the higher layers.

In an aspect, for each monitoring occasion, and for each configured cell, a UE 410 may generate HARQ-ACK bits for each transport block. In some cases, HARQ-ACK-spatial-bundling may be desired and used, e.g., to acknowledge for two TBs (whether from the same or different TRPs). For example, HARQ-ACK-spatial-bundling may be performed for reporting ACK in a PUCCH/PUSCH.

For type 2 HARQ-ACK codebook determination, the number M may also need to be determined. However, in accordance with one aspect, for type 2 HARQ-ACK codebook, the maximum slot timing may be replaced by the slot timing value indicated in a first DCI format detected by the UE, and the minimum slot timing may be replaced by the slot timing value indicated in a last DCI format detected by UE (for which the UE is to send ACK/NACK). The slot timing values in the first and the last DCIs indicate the start and end of the window "M" for PDCCH monitoring. The downlink assignment index (DAI) bits in the DCI format may indicate the counter indicating a progressive count of the number of grants (e.g., relative to the previous PDCCH monitoring occasion corresponding to another DCI), and total grants (e.g., total number of grants across all carriers from the base station) up to current monitoring occasion. The total DAI at a given monitoring occasion may include all scheduled carriers. Thus, for type 2 (dynamic) HARQ ACK/NACK codebook determination, the codebook size and how to populate the codebook may be determined after decoding the DCIs as discussed above.

In an aspect, information corresponding to a TB may comprise of a plurality of codeblock groups (CBGs), where each CBG may include a plurality of codeblocks, e.g., coded information bits corresponding to the TB. In some cases, CBG level ACK/NACK feedback may be supported and used in addition to a TB level ACK/NACK feedback. In an aspect, a base station may indicate whether a UE may report back a CBG level ACK/NACK feedback, e.g., using a CBG-DL on/off indicator. For example, if CBG-DL=OFF, for each monitoring occasion, and for each configured cell, the UE may generate HARQ-ACK bits for each TB, and send ACK/NACK feedback for the TBs. In mode 2, HARQ-ACK-spatial-bundling may be supported and used, e.g., when multiple TBs (or CBGs) correspond to the same ACK/NACK reporting instance (e.g., in a similar way as in example 400 of FIG. 4). A bundled ACK may be reported, for example, in the PUCCH.

If CBG-DL=ON for some cells, and CBG-DL=OFF for other cells, the UE may generate a first HARQ-ACK sub-codebook for the cells with CBG-DL=OFF, e.g., where the first HARQ-ACK sub-codebook may provide a TB level feedback. The UE may further generate a second HARQ-ACK sub-codebook for the cells with CBG-DL=ON, e.g., where the second HARQ-ACK sub-codebook may provide CBG level feedback.

Various aspects and features related to HARQ-ACK/NACK feedback for multi-TRP transmission scenarios are described below. Features related to determining HARQ-ACK codebook size and how the HARQ-ACK codebook is populated are also discussed in connection with various configurations described below. In an aspect, when multiple DCIs are introduced with multiple TRPs, a UE may be configured on the PDCCH monitoring occasion per TRP. For example, the UE may be configured with information and/or provided indication regarding PDCCH monitoring occasions associated with each of the multiple TRPs. In some configurations, the UE may be further indicated on whether to perform the ACK/NACK bundling on the TBs across different TRPs or not. For example, the UE may be indicated, e.g., via an ACK/NACK bundling indicator, that bundling is enabled. Furthermore, the UE may be further configured on how to perform bundling. Bundling may be especially useful when the TBs from different TRPs correspond to the same payload (with potentially different RVIDs). For example, same data payload (with potentially different RVIDs) may be transmitted from two different TRPs (e.g., for diversity) to the UE. In such a case, as long as one of the received TBs successfully decodes, the UE may be configured to send a bundled ACK indicating successful reception and decoding of the TB to both of the TRPs. Thus, rather than sending individual ACK/NACK to each of the TRPs, it may be beneficial to bundle the ACK/NACK for the multiple TRPs in some cases. In one aspect, when bundling is enabled, the bundling may be all of NACK (e.g., different payload) or all of ACK (e.g., same payload for diversity).

In one example, the feedback (e.g., an ACK) for a multi-TRP case, may be configured in the following manner. For each monitoring occasion, each configured cell, and each configured TRP, the UE may generate HARQ-ACK bits for each transport block that the UE may successfully receive. When HARQ-ACK-spatial-bundling is enabled, the UE may bundle the ACKs for multiple TRPs and send the feedback, e.g., via PUCCH/PUSCH.

Thus, in various configurations, HARQ-ACK-bundling for multiple TRPs may be utilized. The UE may be indicated by the network (e.g., serving base station such as base station (180/102) whether to bundle, which set of TRPs to bundle, and how to bundle when bundling is enabled. In accordance with an aspect, the UE may reuse the same HARQ-ACK-spatial-bundling-PUCCH/PUSCH for ACK bundling where the TBs may be from the same or multiple TRPs.

Figure 5:
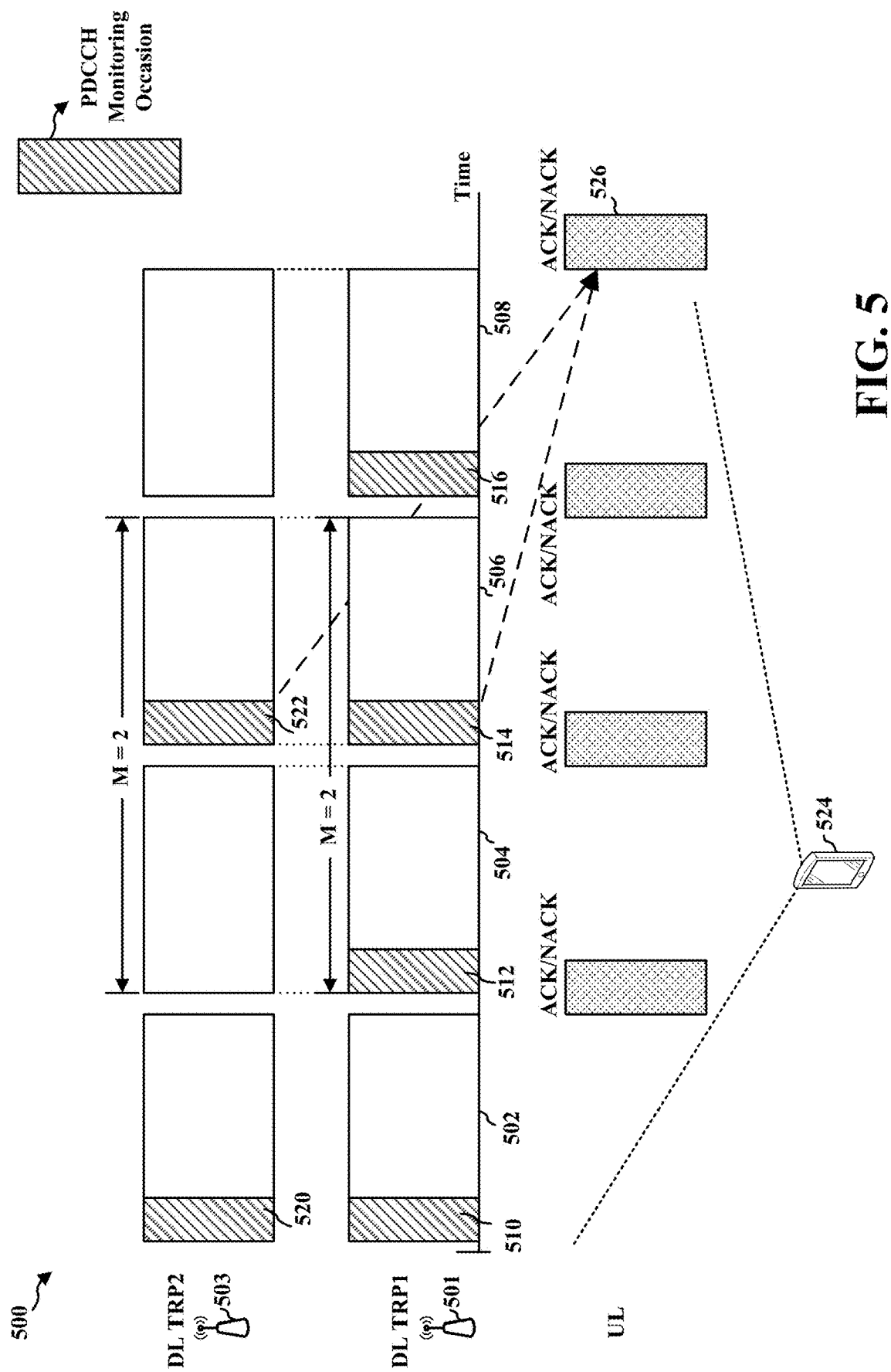
FIG. 5 illustrates an example of determining an ACK/NACK codebook size and providing feedback in a multi-TRP environment.

FIG. 5 illustrates a diagram 500 showing an example of determining HARQ-ACK/NACK codebook size, and providing an ACK/NACK feedback in a multi-TRP environment. In the example, downlink PDCCH transmissions from two TRPs (e.g., TRP 1 501 and TRP 2 503) may correspond to the PDCCH monitoring occasions illustrated in the diagram 500. In the example, TRP 1 501 may have a PDCCH transmission in each slot while TRP 2 503 may have a PDCCH transmission in every other slot. A UE 524 may be provided the information indicating that the UE 524 may monitor PDCCH from TRP1 in every slot and from TRP2 in every other slot. Based on such indication, the UE 524 may determine that the UE 524 may need to monitor 2 PDCCH occasions in some slots. In the illustrated example, for a given ACK/NACK feedback instance, M=2 (where M indicates the window/number of PDCCH monitoring occasions as discussed supra). As shown, in the first slot 504 in M, there is a PDCCH monitoring occasion 512 from TRP 1 501 (and none from TRP 2 503) while in the second slot 506 in M, there is a PDCCH monitoring occasion (514 and 522)

from both TRP 1 501 and TRP 2 503. The UE 524 monitoring the PDCCH monitoring occasions may receive the PDCCH transmissions (including respective DCIs) in the monitoring occasions from the two TRPs and may determine how to provide ACK/NACK feedback.

In accordance with one aspect, when multiple DCIs are introduced with multiple TRPs (such as in the illustrated example), the UE 524 may consider the multiple DCIs in order to determine the size of the ACK/NACK payload and how to send ACK/NACK feedback. The size of the ACK/NACK payload may depend on the number of PDCCHs the UE 424 has been configured to follow. This may be because with more than one PDCCH occasion to be monitored, there is potential for more than one ACK/NACK (therefore larger size codebook) may need to be provided by the UE 524. Accordingly, in the illustrated example, the UE 524 may consider one DCI from TRP 1 501 (in the corresponding monitoring occasion 512) in the first slot, and DCI's from both TRP 1 501 and TRP 2 503 (in the corresponding monitoring occasions 514 and 522 respectively) in the second slot. Furthermore, in some such multi-DCI and multi-TRP examples, prior to sending an ACK/NACK feedback, the UE 525 may consider the two DCIs corresponding to TRP 1 and TRP 2 to determine if the timeline indicated in each of the DCIs for sending a feedback matches.

In accordance with one aspect, the UE 524 is provided an indication on whether to combine the ACK/NACK for the two DCIs, and how to perform the combining. In some configurations, the indication may be provided by reusing an ACK bundling flag for multiple TBs from the same TRP. Assuming, for this example, that the UE 524 is given an indication to perform ACK/NACK bundling, the UE 524 may transmit an ACK/NACK feedback 525 as a feedback following the receipt of the two DCIs corresponding to the second slot 506. The feedback 525 may be an ACK or a NACK, e.g., depending on whether the data from the two TRPs is successfully received at the UE 524 or not, and based on the indication of how to perform the bundling. As discussed supra, bundling may be especially useful when the TBs from two TRPs (TRP 1 501 and TRP 2 503) correspond to the same payload. For example, same data payload (e.g., with potentially different RVIDs) may be transmitted from TRP 1 501 and TRP 2 503 (e.g., for diversity) to the UE 524. In one example case if ACK/NACK bundling is allowed and one of the received TBs is successfully decoded, the UE 524 may send a bundled ACK indicating successful reception and decoding of the TB to both of the TRPs.

In one aspect, for dynamic HARQ-ACK codebook determination, DAI in a PDCCH together with the PDCCH monitoring occasion M may be used to determine the codebook size (e.g., ACK/NACK payload size) for ACK/NACK feedback. Accordingly, in multi DCI and multi TRP cases, the UE may need to consider that DAI indicated in a DCI in a PDCCH transmission. As discussed supra, the DAI in a DCI corresponding to a given PDCCH monitoring occasion may indicate two values, e.g., a counter of the number of grants and a total number of grants up to the current monitoring occasion across all TRPs in all scheduled carriers.

There may be a number of options for defining DAI in multi-TRP scenarios. In one configuration, joint DAI across multiple TRPs may be defined and indicated in the DCI. The joint DAI may include a count of the number of PDCCH grants across all TRPs and all carriers at a given PDCCH monitoring occasion. As the network (e.g., base station 180) may make the scheduling decision across all TRPs and all carriers at a given time, determining a joint DAI for indication in the DCI may desire strong coordination among TRPs. For a better understanding of the joint DAI approach in a multi-TRP multi-carrier case, consider the example illustrated in FIG. 6 and discussed below.

Figure 6:
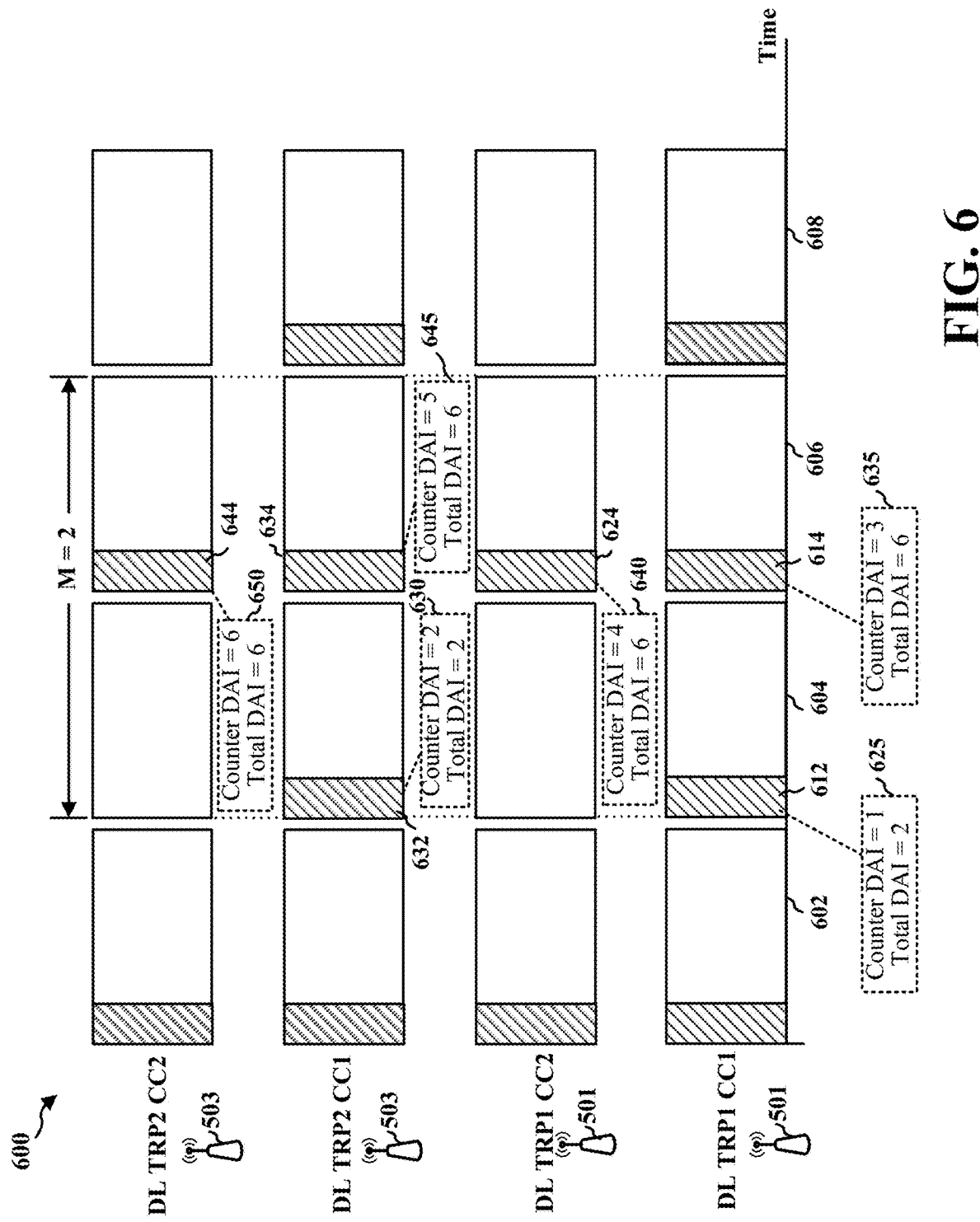
FIG. 6 illustrates an example where joint downlink assignment indices (DAIs) are utilized in a network including multiple TRPs.

FIG. 6 illustrates a diagram 600 showing a joint DAI example where a DAI corresponding to a PDCCH monitoring occasion indicates a count of PDCCH grants across multiple TRPs and multiple scheduled carriers at the given PDCCH monitoring occasion. In the illustrated example, downlink PDCCH transmissions from two TRPs (e.g., TRP 1 501 and TRP 2 503) in two carriers (e.g., carrier component 1 (CC1) and carrier component 2 (CC2)) may correspond to the PDCCH monitoring occasions illustrated in the diagram 600. In the example, TRP 1 501 and TRP 2 503 may have a PDCCH transmission on CC1 in each slot, while when using CC2 both TRP 1 501 and TRP 2 503 may have a PDCCH transmission in every other slot as shown. During each monitoring occasion corresponding to a given TRP, the TRP may transmit DCI including DAI. In the illustrated example, for a given ACK/NACK feedback instance, M=2 (where M indicates the window/number of PDCCH monitoring occasions as discussed supra). As shown, in the first slot 604 in M, there is a first PDCCH monitoring occasion 612 corresponding to TRP 1 501 in CC1 and a first PDCCH monitoring occasion 632 corresponding to TRP 2 503 in CC1. In the second slot 606 in M, there is a second PDCCH monitoring occasion 614 corresponding to TRP 1 501 in CC1, a third PDCCH monitoring occasion 624 corresponding to TRP 1 501 in CC2, a second PDCCH monitoring occasion 634 corresponding to TRP 2 503 in CC1, and a third PDCCH monitoring occasion 644 corresponding to TRP 2 503 in CC2.

In the joint DAI approach, a DAI is configured to include the count of PDCCH grants across the multiple TRPs and multiple carriers at a given monitoring occasion. Considering the first slot 604 in M, a first PDCCH transmission during the first PDCCH monitoring occasion 612 from TRP 1 in CC1 may carry DAI including counter DAI value and total DAI value of the number of PDCCH grants at the first PDCCH monitoring occasion 612. The DAI at the first PDCCH monitoring occasion 612 corresponding to TRP 1 may include a counter DAI value=1 and a total DAI value=2. At the first PDCCH monitoring occasion 612, the counter DAI value equals 1 because TRP 1 is aware that a first PDCCH grant is transmitted by TRP 1 in the first PDCCH monitoring occasion 612 in M and none has been transmitted by another TRP. The total DAI value is populated as equal to 2, because TRP 1 is aware that besides the PDCCH grant transmitted by TRP1 501, there is one more PDCCH grant transmitted during the same time interval from TRP 2 in CC1 (e.g., in PDCCH transmission in monitoring occasion 632 which overlaps in time with monitoring occasion 612). Therefore, the total number of PDCCH grants across all TRPs and all carriers at monitoring occasion 612 is 2.

The DAI at the first PDCCH monitoring occasion 632 corresponding to TRP 2 may include a counter DAI value=2 and a total DAI value=2 as indicated at 630. The counter DAI value equals 2 because the counter value is progressively incremented relative to the previous counter value. In this case, TRP 2 503 is aware that the TRP 1 is transmitting its first PDCCH grant (in the first PDCCH monitoring occasion 612 corresponding to TRP 1 501) and TRP 2 503 is transmitting a PDCCH grant in the PDCCH monitoring occasion 632 (which makes the PDCCH grant transmitted by TRP 2 the second PDCCH grant), and therefore the counter DAI value=2 (e.g., 1+1). The total DAI value equals 2 because TRP 2 503 is aware that the total number of PDCCH grants across all TRPs (e.g., TRP 1 501 and TRP 2 503) in all CCs at the given monitoring occasion is 2.

In the second slot 606 in M, the DAI at the PDCCH monitoring occasion 614 corresponding to TRP 1 501 may include a counter DAI value=3 (e.g., 2+1) and a total DAI value=6 as indicated at 635. As discussed supra, the counter DAI value is progressively incremented relative to the previous counter value when an additional PDCCH grant is transmitted. Accordingly, in this case the counter DAI value is incremented to 3 because 2 PDCCH grants have been previously transmitted (from TRP 1 501 and TRP 2 503) in the previous PDCCH monitoring occasion and 1 PDCCH grant during the current monitoring occasion 614. The total DAI value equals 6 because TRP 1 is aware that the total number of PDCCH grants across TRP 1 and TRP 2 (in CC1 and CC2) equals 2 in the previous slot 604, and the total number of PDCCH grants across TRP 1 and TRP 2 (in CC1 and CC2) in the current slot 606 is 4 because in each of the four monitoring occasions 614, 624, 634, and 644 (which may overlap in time) one PDCCH grant is transmitted. Accordingly, in this case, the total DAI value equals 2+4=6 at the given monitoring occasion.

The DAI for each of the other PDCCH monitoring occasions corresponding to TRP1 and TRP2 may be configured in a similar manner for a joint count across TRP 1 501 and TRP 2 503. For example, in the second slot 606 in M, the DAI at the PDCCH monitoring occasion 624 corresponding to TRP 1 501 may include a counter DAI value=4 and a total DAI value=6 as indicated at 640. The DAI at the PDCCH monitoring occasion 634 corresponding to TRP 2 503 may include a counter DAI value=5 and a total DAI value=6 as indicated at 645. The DAI at the PDCCH monitoring occasion 644 corresponding to TRP 2 may include a counter DAI value=6 and a total DAI value=6 as indicated at 650.

In another aspect, DAI may be defined for each TRP separately. In such an approach, unlike the joint DAI, the DAI in a PDCCH transmission from a given TRP does not include the count of PDCCH grants from other TRPs. Such an approach allows different TRPs to issue PDCCH independently with non-ideal backhaul or loose coordination across multiple TRPs. The independent DAI approach in a multi-TRP multi-carrier scenario may be better appreciated in view of the example illustrated in FIG. 7 and discussed below.

Figure 7:
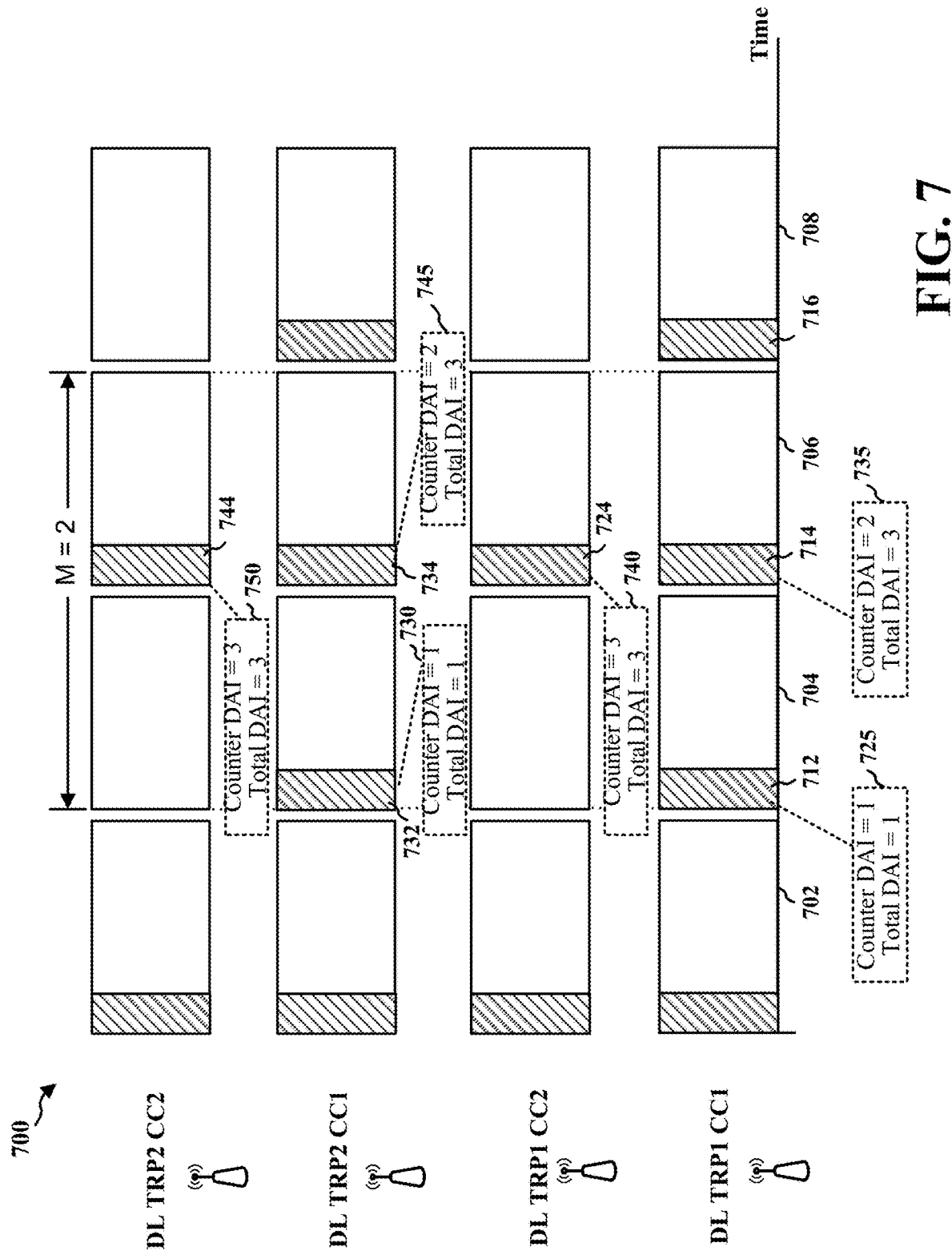
FIG. 7 illustrates an example where separate and independent DAIs configured by each TRP are used in a network including multiple TRPs.
Figure 8:
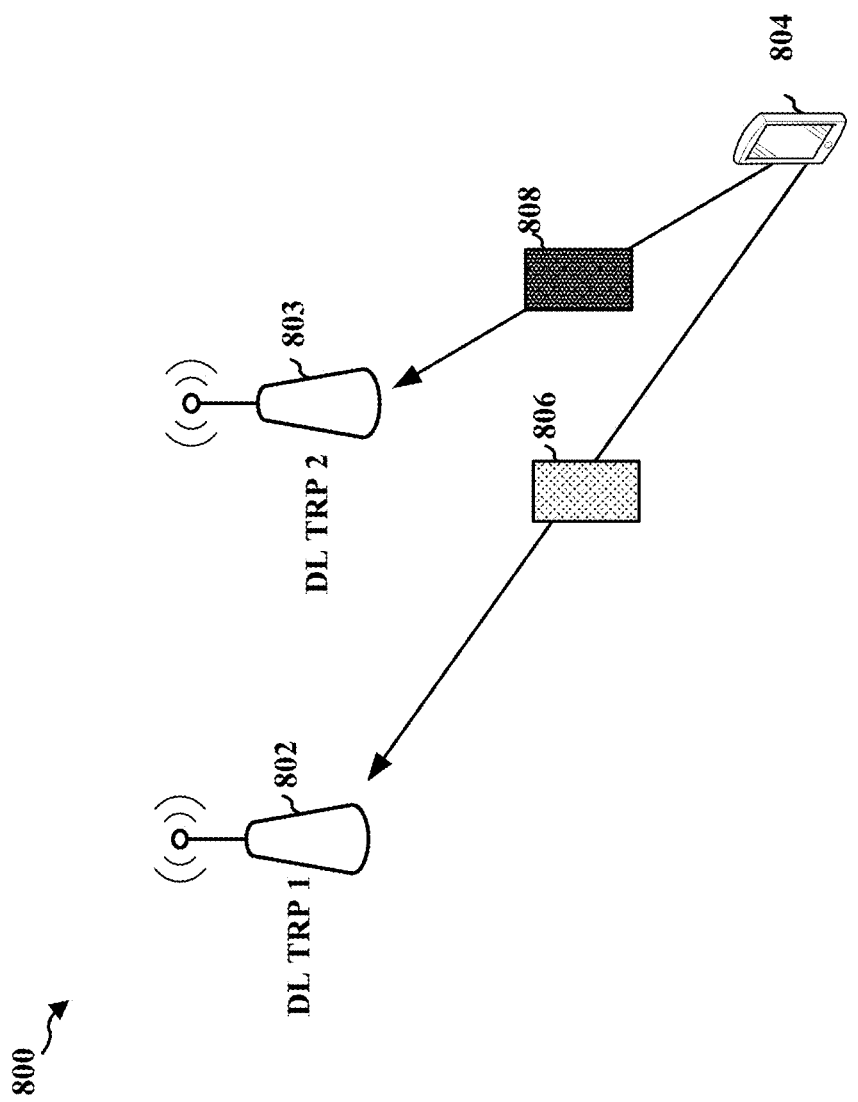
FIG. 8 illustrates an example of a UE transmitting individual physical uplink control channels (PUCCHs) to multiple TRPs, in accordance with certain aspects.

FIG. 7 illustrates a diagram 700 showing an example of separate and independent DAIs configured by each of the multiple TRPs. As illustrated in the example, while a DAI in a PDCCH transmission from a given TRP may include the number of PDCCH grant assignments from the given TRP, the DAI may not include the count of PDCCH grants from other TRPs. Unlike the joint DAI where a DAI corresponding to a PDCCH monitoring occasion indicates a count of PDCCH grants across multiple TRPs and multiple scheduled carriers, the independent DAI configured a given TRP may include the PDCCH grant count for that TRP. In the illustrated example, downlink PDCCH transmissions from two TRPs (e.g., TRP 1 501 and TRP 2 503) in two carriers (e.g., CC1 and CC2) may correspond to the PDCCH monitoring occasions illustrated in the diagram 700. In the example, TRP 1 501 and TRP 2 503 may have a PDCCH transmission on CC1 in each slot, while when using CC2 both TRP 1 501 and TRP 2 503 may have a PDCCH transmission in every other slot as shown. During each monitoring occasion corresponding to a given TRP, the TRP may transmit DCI including DAI. In the illustrated example, for a given ACK/NACK feedback instance, M=2. As shown, in the first slot 704 in M, there is a first PDCCH monitoring occasion 712 corresponding to TRP 1 501 in CC1 and a first PDCCH monitoring occasion 732 corresponding to TRP 2 503 in CC1. In the second slot 706 in M, there is a second PDCCH monitoring occasion 714 corresponding to TRP 1 501 in CC1, a third PDCCH monitoring occasion 724 corresponding to TRP 1 501 in CC2, a second PDCCH monitoring occasion 734 corresponding to TRP 2 503 in CC1, and a third PDCCH monitoring occasion 744 corresponding to TRP 2 503 in CC2.

Consider the first slot 704 in M, a first PDCCH transmission during the first PDCCH monitoring occasion 712 corresponding to TRP 1 501 in CC1 may carry DAI including counter DAI value and total DAI value of the number of PDCCH grants at the first PDCCH monitoring occasion 712. The DAI from TRP 1 501 may carry the count of PDCCH grants from TRP 1 501 so far within M but does not include the count of PDCCH grants from TRP 2 503. Thus, as shown at 725, the DAI at the first PDCCH monitoring occasion 712 corresponding to TRP 1 501 may include a counter DAI value=1 and a total DAI value=1. The counter DAI value equals 1 because the PDCCH grant at monitoring occasion 712 is the first PDCCH grant from TRP 1 within M. The total DAI value is 1 because, within M, there has been a total of 1 PDCCH grant assignment transmitted from TRP 1 up until PDCCH monitoring occasion 712. Similarly, as indicated at 730, the DAI at the first PDCCH monitoring occasion 732 corresponding to TRP 2 503 may include a counter DAI value=1 and a total DAI value=1 because there has been just 1 PDCCH grant assignment transmitted from TRP 2 503 in PDCCH monitoring occasion 712.

In the second slot 706 in M, the DAI at the PDCCH monitoring occasion 714 corresponding to TRP 1 501 may include a counter DAI value=2 (e.g., 1+1) and a total DAI value=3 as indicated at 735. As discussed supra, the counter DAI value is progressively incremented relative to the previous counter value when an additional PDCCH grant is transmitted at the given PDCCH monitoring occasion. Accordingly, in this case the counter DAI value is incremented to 2 because from TRP 1 perspective, TRP 1 501 has issued one PDCCH grant earlier in the previous PDCCH monitoring occasion 712 in addition to the second PDCCH grant at PDCCH monitoring occasion 714. The total DAI value equals 3 because TRP 1 501 is aware that so far TRP 1 501 has issued a total number of 3 PDCCH grants, e.g., 2 PDCCH grants in CC1 and 1 PDCCH grant in CC2 (at monitoring occasion 724 (that overlaps in time with monitoring occasion 714).

Similarly, the DAI for each of the other PDCCH monitoring occasions corresponding to TRP 1 501 and TRP 2 503 may be independently configured in a similar manner. For example, in the second slot 706 in M, the DAI at the PDCCH monitoring occasion 724 corresponding to TRP 1 501 (CC1) may include a counter DAI value=3 and a total DAI value=3, as indicated at 740. The DAI at the PDCCH monitoring occasion 734 corresponding to TRP 2 503 may include a counter DAI value=2 and a total DAI value=3 (as indicated at 745) for the similar reasons as discussed above with respect to the DAI from TRP 1 501 at 735. Finally, the DAI at the PDCCH monitoring occasion 744 corresponding to TRP 2 503 may include a counter DAI value=3 and a total DAI value=3.

Thus, from the above discussion with respect to the example of FIG. 6 and FIG. 7, it may be appreciated that there may be a plurality of options on configuring/defining DAI. A base station (e.g., gNB 180) may indicate (e.g., to a UE such as UE 104/524) the definition of DAI (e.g., joint across multiple TRPs or separate/independent for each TRP) depending on a given implementation. As mentioned above, the definition/configuration of DAI that may be used may be decided by the network based on the given conditions (e.g., gNB and/or backhaul implementation). When the gNB has tight coordination and control, then the joint DAI approach may be used in which case the UE may not need to do extra calculation/determination (e.g., for combining DAI from multiple TRPs for ACK/NACK bundling).

In the case of non-ideal backhaul or loose coordination across multiple TRPs, it may suitable to use the separate DAI approach that allows different TRPs to issue PDCCH independently without much coordination. In this case, the UE behavior (e.g., UE that receives the PDCCH grant) may be different as the UE may perform somewhat additional calculation/processing. For example, when the UE provides a joint (e.g., bundled) ACK/NACK feedback, the UE may combine the DAI from multiple TRPs to form the ACK/NACK codebook (e.g., sum over the DAI from multiple TRPs). Similarly, the DAI in an UL grant may also combine the multiple DCIs from multiple TRPs (i.e., sum over multiple TRPs).

For example, when gNB issues UL grant, the gNB should be aware of the multiple PDCCHs sent from multiple TRPs, which may add some scheduling constraint (e.g., no more additional DL grants than the number indicated in the DAI in the UL grant may be scheduled). However, one option to address such a constraint is, for example, the gNB may add a bit margin in the DAI signaled in UL grant when the future DL scheduling flexibility is desired.

The base station may need to know the DAI across multiple TRPs for PUCCH reception. There should be enough time allowed for multiple TRPs to convey the scheduling decision when it comes to PUCCH reception.

In some aspects, a UE may send joint PUCCH for transmission across multiple DL TRPs. In accordance with one aspect, rather than sending a joint PUCCH, a UE may transmit multiple PUCCHs in UL, e.g., with each individual PUCCH for each DL TRP. As an example, consider FIG. 8 which illustrates a diagram 800 showing an example of a UE 804 transmitting individual PUCCHs to multiple TRPs including TRP 1 801 and TRP 2 802. As illustrated, in one example, the UE 804 may transmit a first PUCCH (e.g., PUCCH 1 806) to TRP 1 802, and a second PUCCH (e.g., PUCCH 2 808) to TRP 2 803. Each individual PUCCH may be used to transmit uplink control information from the UE 804 to the corresponding TRP. In yet another aspect, UE may send joint PUCCH to multiple TRPs to ensure better reliability with UL PUCCH reception.

In some configurations, the multiple PUCCHs may be transmitted from UE 804 at different times, e.g., in a TDM manner. In some other configurations, the multiple PUCCHs may be transmitted concurrently on different PUCCH resources, e.g., with each of PUCCHs 804 and 806 being transmitted on a different resource. In yet another configuration, the multiple PUCCHs may be transmitted concurrently from multiple UL TRPs. For example, multiple UL TRPs may be multiple antenna arrays/beams at the UE 804, and each of the antenna arrays/beams (UL TRP) may transmit a PUCCH concurrently.

Figure 9:
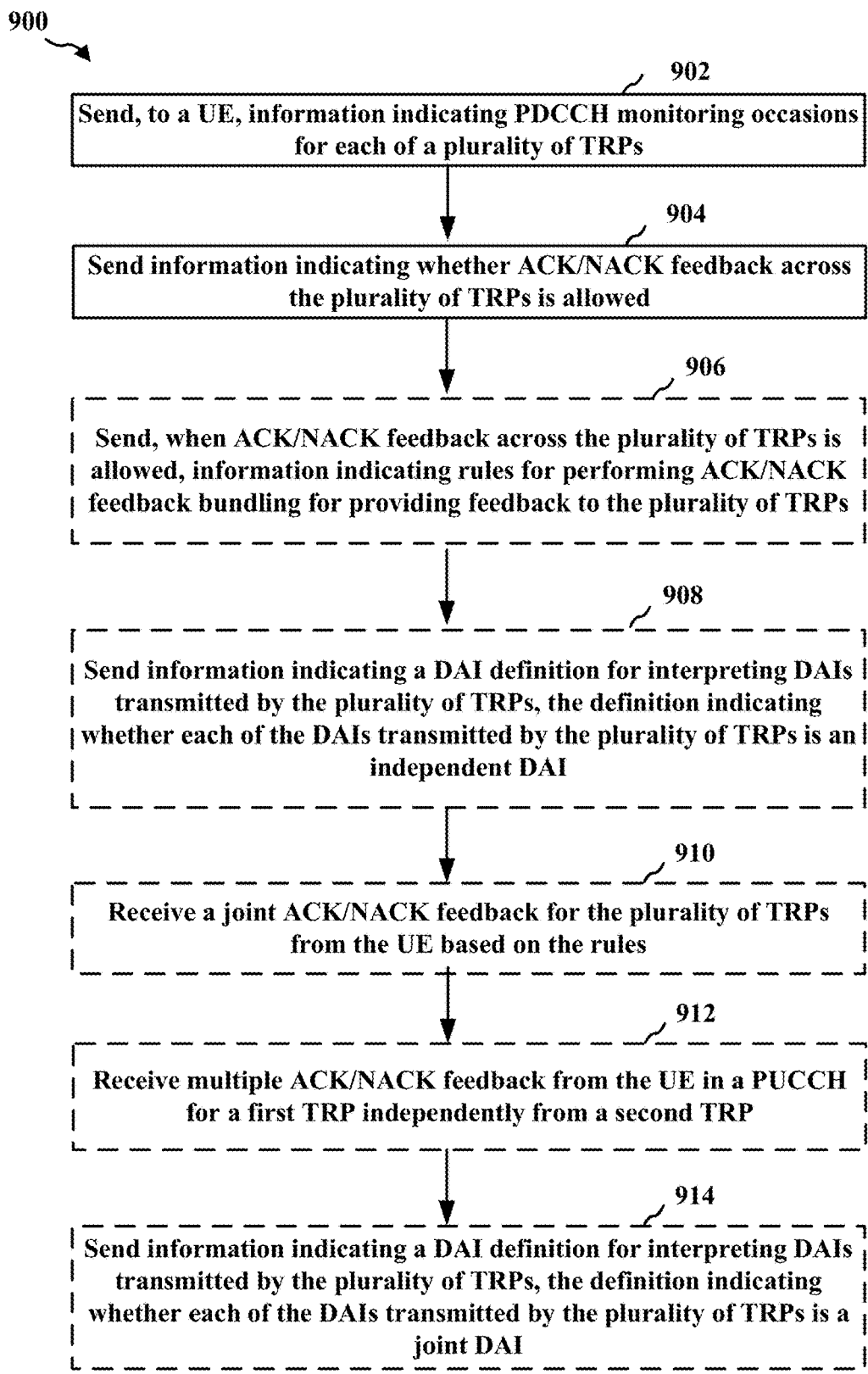
FIG. 9 is a flowchart of a method of wireless communication.

FIG. 9 is a flowchart 900 of an example method of wireless communication in accordance with aspects presented herein. The method may be performed by a base station (e.g., base station 102, 180, 310, the apparatus 1102, 1102') of a cell that may include a plurality of downlink TRPs. The base station implementing the method of flowchart 900 may also be referred to as a downlink TRP. The downlink TRPs may be, e.g., additional base stations, access points, or other such nodes which may communicate with UEs in the cell. In such a case the downlink TRPs may communicate and coordinate with one another over a backhaul network. In some other configurations, a downlink TRP may be an antenna array on a base station/access point.

At 902, the base station may send (e.g., transmit), to a UE, information indicating PDCCH monitoring occasions for each of the plurality of TRPs. For example, the base station 180 may send configuration information regarding PDCCH monitoring occasions for various TRPs (e.g., in a cell served by base station 180) to one or more UEs (e.g., UE 104/524/804). In an aspect, the base station may be the serving base station of the cell and may know the PDCCH transmission schedule of various TRPs (or acquire/obtain from the TRPs). For example, with reference to FIG. 5 the plurality of TRPs may include a TRP 1 501 and TRP 2 503, and the base station 180 may send configuration information regarding PDCCH monitoring occasions (illustrated in FIG. 5) associated with TRP 1 501 and TRP 2 503. The configuration information may be provided to the UE 524, e.g., via RRC signaling, in some aspects.

At 904, the base station may send information indicating whether ACK/NACK feedback across the plurality of TRPs is allowed. Multiple ACK/NACK feedback may be jointly bundled across a plurality of TRPs for transmission to multiple TRPs, or may be individually concatenated per TRP for transmission to individual TRPs (e.g. for multiple PDCCH monitoring occasions from a single TRP and/or component carriers of a single TRP). For example, with reference to FIG. 5, the base station may indicate to the UE 524 whether to combine/bundle an ACK/NACK feedback for the TRPs 501 and 503, e.g., when sending feedback in response to data transmission from the TRPs 501 and 503. In some configurations, the indication of the ACK/NACK feedback bundling may be provided via an ACK bundling flag. In some configurations, the indication may be provided by repurposing an ACK bundling flag which is otherwise used to indicate ACK bundling enablement for multiple transport blocks from the same TRP. As discussed in more detail supra, the ACK/NACK feedback bundling across multiple TRPs may allow a joint ACK/NACK feedback to be provided by the UE in response to data transmission from the plurality of TRPs to the UE.

At 906, the base station may send, when ACK/NACK feedback across the plurality of TRPs is allowed, information indicating rules for performing ACK/NACK feedback bundling for providing feedback to the plurality of TRPs. As discussed supra, when ACK/NACK feedback bundling is enabled, the UE may need to consider PDCCH transmissions (e.g., DCIs) from the multiple TRPs in order to determine if a joint/combined ACK/NACK corresponding to an ACK/NACK feedback instance may be provided to the multiple TRPs. In addition to indicating that such bundling is allowed, in accordance with an aspect, the base station may also provide information (e.g., rules) to the UE indicating how to perform the bundling and combine the ACK/NACK for the multiple TRPs. For instance, in one example, the plurality of TRPs may include TRP 1 501 and TRP 2 503 and the base station 180 may be aware that same data payload is transmitted from TRP 1 501 and TRP 2 503 (e.g., in corresponding PDSCHs). In such an example, to allow the UE to understand how to properly combine ACK/NACK feedback for the TRPs, the base station 180 may provide a rule indicating that upon successful reception of data by the UE 524 from at least one of the TRPs 501 and 503 (e.g., any one of the two TRPs) the UE may combine ACK bits and thereby provide a joint/combined ACK feedback for TRP 1 501 and TRP 2 503. In such an example, the rules may further indicate that a joint NACK feedback may be provided by the UE 524 as the feedback for the first TRP (e.g., TRP 1 501) and the second TRP (TRP 2 503) when the UE 524 fails to successfully receive data from both the first TRP and the second TRP.

In another example, the rules may indicate that a joint NACK feedback may be provided as a feedback to the plurality of TRPs when the UE fails to successfully receive data from at least one of the plurality of TRPs. For example, the plurality of TRPs may include TRP 1 501 and TRP 2 503, and the base station 180 may be aware that different data payload is transmitted from TRP 1 501 and TRP 2 503 (e.g., in corresponding PDSCHs). In such an example, the base station may send rules indicating that the UE 524 should send a joint NACK unless data from both of the TRPs is successfully received. In other words, the rules may indicate that the UE should send a joint/combined NACK if data from one of the TRPs (e.g., either from TRP 1 501 or TRP 2 503) is not successfully received or detected. In such an example, the rules may further indicate that a joint ACK feedback should be provided as a feedback for the first TRP and the second TRP when the UE successfully receives data from both the first TRP or the second TRP. In other words, the rules may indicate that the UE should send a joint ACK for TRP 1 501 and TRP 2 503 only when the UE successfully receives data from both TRP 1 501 and TRP 2 503.

In one configuration, at 908 the base station may send information indicating a DAI definition for interpreting DAIs transmitted by the plurality of TRPs in corresponding PDCCH transmissions. The DAI definition may indicate whether each of the DAIs transmitted by the plurality of TRPs is an independent DAI. For example, as discussed in connection with FIGS. 6 and 7, there may two types of DAIs (e.g., joint DAI across multiple TRPs, or separate independent DAI per TRP) which may be used in the system depending on network configuration, base station implementation, backhaul speed etc. In order to allow the UE to properly understand and interpret a DAI (transmitted from various TRPs such as TRP 1 501 and TRP 2 503), the base station 180 may inform the UE on what type of DAI is utilized in the system. In case of independent DAIs are used in the system, an independent DAI from a given TRP in a given PDCCH monitoring occasion may include a count of PDCCH grants from the given TRP across all scheduled carriers (but not across all TRPs) up to the given PDCCH monitoring occasion. For example, the independent DAI is discussed in more detail in connection with FIG. 7. For example, in the case of non-ideal backhaul or loose coordination across multiple TRPs, it may suitable to use the separate DAI approach that allows different TRPs to issue PDCCH independently without much coordination. In this case, the UE 524 may perform additional calculation/processing. For example, when the UE provides a joint (e.g., bundled) ACK/NACK feedback, the UE may combine the DAI from multiple TRPs to form the ACK/NACK codebook (e.g., sum over the DAI from multiple TRPs).

While the operations illustrated in blocks 902 through 908 have been shown as separate operations, in some configurations, one or more of the sending operations may be combined into a single sending (e.g., transmission) step. In other words, the sending operations discussed above with respect to blocks 902 through 908 may each be an individual separate transmission, or one or more of the sending operations illustrated in the blocks may occur as part of a single transmission.

In one configuration, the base station (implementing the method) may be the first TRP (e.g., TRP 1 501) and the second TRP (TRP 2 503) may be another base station/AP. In one such configuration, at 910, the base station may receive a joint ACK/NACK feedback for the plurality of TRPs (e.g., TRPs 501 and 503) from the UE based on the rules. For example, the base station 180 may receive a joint ACK/NACK from the UE 524 in accordance with the rules communicated to the UE 524 regarding generating a combined ACK/NACK feedback for the plurality of TRPs. In one example, the base station 180 may receive a joint ACK feedback from the UE 524 (e.g., in a PUCCH or PUSCH) based on the rules. In one example, the base station 180 may receive a joint NACK feedback from the UE 524 (e.g., in a PUCCH or PUSCH) based on the rules. The joint ACK/NACK feedback from the UE may be further based on the DAIs transmitted from the plurality of TRPs. For example, as discussed supra, to determine the ACK/NACK feedback size for the joint ACK/NACK feedback, the UE may consider the multiple DAIs (in corresponding DCIs) transmitted from the multiple TRPs.

In another configuration, at 912, the base station may receive multiple ACK/NACK feedback from the UE in a PUCCH for the first TRP independently from the second TRP. In accordance with one aspect, rather than receiving a joint PUCCH, the base station may receive an individual PUCCH from the UE. For example, referring to FIG. 8, a UE 804 may transmit individual PUCCHs to multiple TRPs including TRP 1 801 and TRP 2 802. As illustrated, in one example, the UE 804 may transmit a first PUCCH (e.g., PUCCH 1 806) to TRP 1 802, and a second PUCCH (e.g., PUCCH 2 808) to TRP 2 803.

The base station may receive multiple ACK/NACK feedback from the UE in the individual PUCCH. For instance, referring to FIG. 4, which depicts two monitoring occasions corresponding to the same ACK/NACK reporting instance, the UE 410 may determine that the size of the ACK/NACK codebook should be sufficient enough to give feedback for 2 TBs corresponding to the two PDCCH monitoring occasions 404 and 408. Accordingly, in this particular example, the ACK/NACK codebook size may be, e.g., 2 bits, where 1 bit may be for the TB associated with the first monitoring occasion 404 and the other 1 bit for the TB associated with the second monitoring occasion 408. Assuming that the ACK/NACK feedback to be transmitted in this example is an ACK, the UE 410 may transmit ACK 412 acknowledging both TBs. In some cases, HARQ-ACK-spatial-bundling may be desired and used, e.g., to acknowledge for two TBs (whether from the same or different TRPs).

In one configuration, at 914 the base station may send information indicating a DAI definition for interpreting DAIs transmitted by the plurality of TRPs in corresponding PDCCH transmissions. The DAI definition may indicate whether each of the DAIs transmitted by the plurality of TRPs is a joint DAI. For example, as discussed in connection with FIGS. 6 and 7, there may two types of DAIs (e.g., joint DAI across multiple TRPs, or separate independent DAI per TRP) which may be used in the system depending on network configuration, base station implementation, backhaul speed etc. In order to allow the UE to properly understand and interpret a DAI (transmitted from various TRPs such as TRP 1 501 and TRP 2 503), the base station 180 may inform the UE on what type of DAI is utilized in the system.

For example, when a fast backhaul network exists connecting multiple TRPs in the network (including the base station (e.g., gNB 180)), there may be tight coordination between the TRPs. The base station may make scheduling decision across the multiple TRPs and scheduled carriers at a given time, then a joint DAI may be implemented. As discussed in detail supra in connection with FIG. 6, the joint DAI from a TRP in a given PDCCH monitoring occasion may include a count of PDCCH grants across the plurality of TRPs and all scheduled carriers up to the given PDCCH monitoring occasion. For example, as discussed in connection with FIG. 6, the total DAI value in a DCI (e.g., transmitted by a TRP) may indicate the total number of grants up to the current monitoring occasion across all TRPs in all scheduled carriers. In the case of joint DAI, as the combining of the total number of grants across all TRPs is performed at the TRP side, logical operations for combining the number of grants may not be needed at the UE side. Thus, in the joint DAI case, when the UE 524 may determine the ACK/NACK codebook size considering multiple DAIs, the UE 524 may not need to combine the DAIs from multiple TRPS for determining the codebook size.

Figure 10:
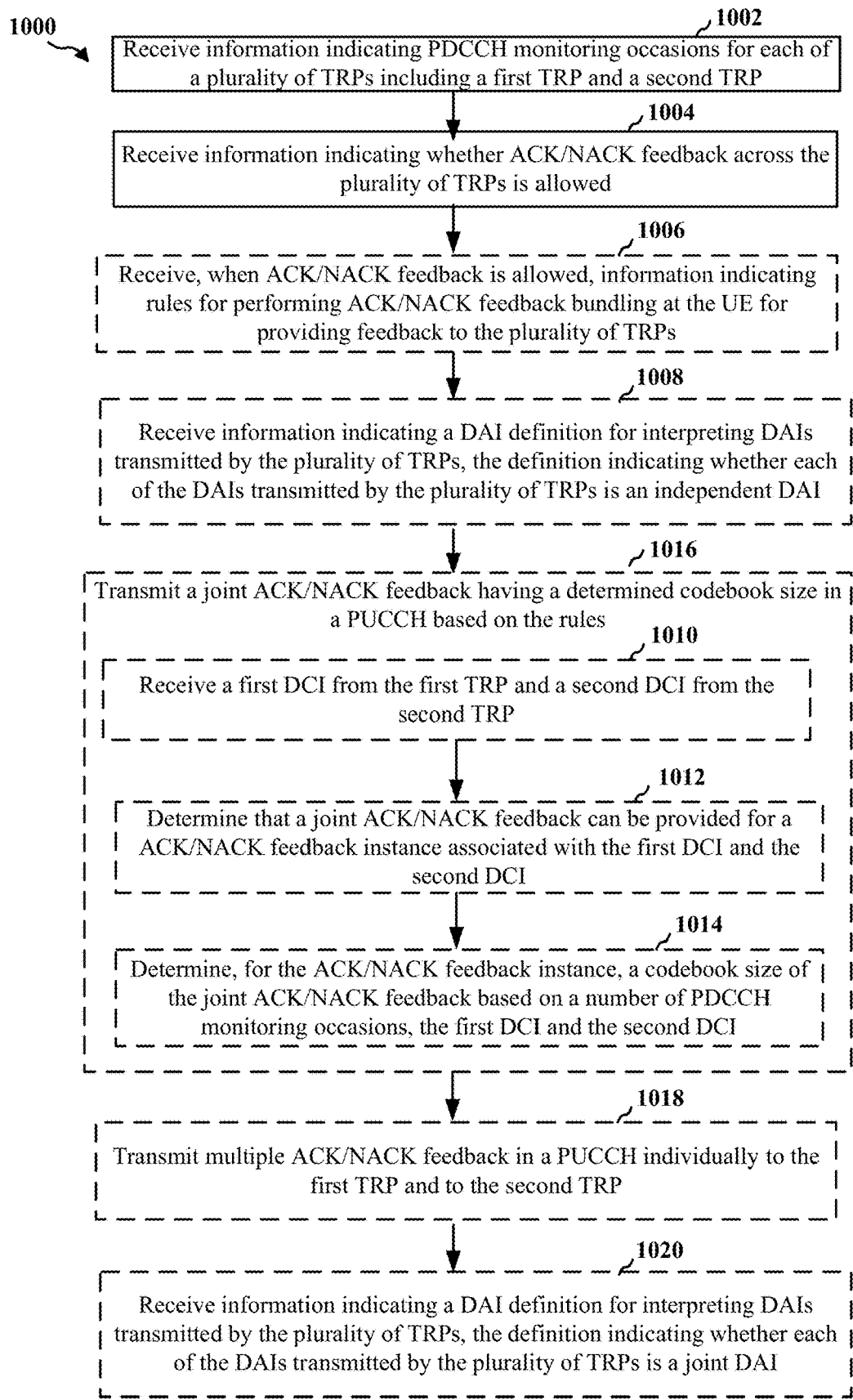
FIG. 10 is a flowchart of another method of wireless communication.

FIG. 10 is a flowchart 1000 of a method of wireless communication. The method may be performed, for example, by a UE (e.g., the UE 104/350/524/804, UE 1150, the apparatus 1302/1302'). At 1002, the UE may receive information indicating PDCCH monitoring occasions for each of a plurality of TRPs including a first TRP and a second TRP. For example, as discussed supra, when multiple DCIs are introduced with multiple TRPs in a network, the UE may be configured (e.g., by a serving base station which may also be one of the multiple TRPs) on the PDCCH monitoring the configurations per TRP. For example, with reference to FIG. 5, the UE 524 may receive information indicating PDCCH monitoring occasions for each of the multiple TRPs, e.g., including the first TRP (TRP 1 501) and the second TRP (TRP 2 503). The information may be received, e.g., from TRP 1 501, or TRP 2 503, or another base station which may be the serving base station for the UE 524. In some examples configurations, one of the TRPs 501 and 503 may be the serving base station for the UE 524. In another example, another base station (such as base station 102/180) may be the serving base station.

At 1004, the UE may receive information indicating whether ACK/NACK feedback across the plurality of TRPs is allowed. Multiple ACK/NACK feedback may be jointly bundled across a plurality of TRPs for transmission to multiple TRPs, or may be individually concatenated per TRP for transmission to individual TRPs (e.g. for multiple PDCCH monitoring occasions from a single TRP and/or component carriers of a single TRP). For example, as discussed supra, the UE 524 may receive an indication (e.g., in a RRC message with a bundling flag) from the base station.

At 1006, the UE may receive, when ACK/NACK feedback across the plurality of TRPs is allowed, information indicating rules for performing the ACK/NACK feedback bundling at the UE for providing feedback to the plurality of TRPs. For example, as discussed supra, the rules may indicate when the UE may perform ACK/NACK bundling, how to perform the bundling, and for which set of TRPs to perform the bundling.

At 1008, the UE may receive information indicating a DAI definition for interpreting DAIs transmitted by the plurality of TRPs (e.g., in corresponding DCIs. The DAI definition may indicate whether each of the DAIs transmitted by the plurality of TRPs is an independent DAI. For example, as discussed supra in connection with FIGS. 6-7, depending on a given implementation the DAIs transmitted by the multiple TRPs may be joint DAIs or independent DAIs. An independent DAI from a TRP in a given PDCCH monitoring occasion may include a count of PDCCH grants from the TRP across all scheduled carriers (but not across all TRPs) up to the given PDCCH monitoring occasion.

In one configuration at 1016, the UE may transmit joint ACK/NACK feedback having a determined codebook size (discussed infra at 1010, 1012, and 1014) in a PUCCH based on the bundling/combining rules. For example, referring to FIG. 5, the UE 524 may transmit the joint ACK/NACK feedback 526 that has been configured by the UE 524 in accordance with a determined codebook size and based on the ACK/NACK bundling rules. For example, in one configuration, the rules may indicate that a joint ACK feedback may be provided for the first TRP (e.g., TRP 1 501) and the second TRP (e.g., TRP 1 501) upon successful reception of data by the UE from at least one of the first TRP or the second TRP. This may be the case, for example, when same data payload may be transmitted from both the first and second TRPs, and because of coordination between the multiple TRPs and the serving base station, the network can configure the UE 524, e.g., by providing rules, to send a joint ACK when data from any one of the first and second TRPs is received by the UE 524. Thus, in such an example, the joint ACK/NACK feedback transmitted at 1016 based on the rules may be the joint ACK feedback when the UE successfully receives data from at least one of the first TRP or the second TRP. In one configuration, the rules may further indicate that a joint NACK feedback may be provided for the first TRP and the second TRP when the UE fails to successfully receive data from both the first TRP and the second TRP. In such an example, the joint ACK/NACK feedback transmitted based on the rules may be the joint NACK feedback when the UE fails to successfully receive data from both the first TRP and the second TRP.

In another example, the rules indicate that a joint NACK feedback may be provided for the first TRP and the second TRP when the UE fails to successfully receive data from at least one of the first TRP or the second TRP. This may be the case, for example, when different data payload may be transmitted from both the first and second TRPs, and because of coordination between the multiple TRPs and the serving base station, the network can configure the UE 524, e.g., by providing rules, to send a NACK feedback when the UE fails to receive/decode data from any one of the first and second TRPs. In such an example, the joint ACK/NACK feedback transmitted at 1016 based on the rules may be the joint NACK feedback when the UE fails to successfully receive data from at least one of the first TRP or the second TRP. In one configuration, the rules may further indicate that a joint ACK feedback may be provided for the first TRP and the second TRP when the UE successfully receives data from both the first TRP or the second TRP. In such an example, the joint ACK/NACK feedback transmitted based on the rules may be the joint ACK feedback when the UE successfully receives data from both the first TRP and the second TRP.

In another configuration, at 1018, the UE may transmit multiple ACK/NACK feedback in a PUCCH individually to the first TRP and to the second TRP. In accordance with one aspect, rather than transmitting a joint PUCCH, the UE may transmit an individual PUCCH to each TRP. For example, referring to FIG. 8, a UE 804 may transmit individual PUCCHs to multiple TRPs including TRP 1 801 and TRP 2 802. As illustrated, in one example, the UE 804 may transmit a first PUCCH (e.g., PUCCH 1 806) to TRP 1 802, and a second PUCCH (e.g., PUCCH 2 808) to TRP 2 803.

In some configurations, the multiple PUCCHs may be transmitted from UE 804 at different times, e.g., in a TDM manner. In some other configurations, the multiple PUCCHs may be transmitted concurrently on different PUCCH resources, e.g., with each of PUCCHs 804 and 806 being transmitted on a different resource. In yet another configuration, the multiple PUCCHs may be transmitted concurrently from multiple UL TRPs. For example, multiple UL TRPs may be multiple antenna arrays/beams at the UE 804, and each of the antenna arrays/beams (UL TRP) may transmit a PUCCH concurrently.

To determine codebook size for joint ACK/NACK feedback, at 1010, the UE may receive a first DCI from the first TRP and a second DCI from the second TRP. For example, with reference to FIG. 5, the UE 524 may receive a first DCI (e.g., in the PDCCH monitoring occasion 510) from TRP 1 501, and a second DCI (e.g., in the PDCCH monitoring occasion 520) from TRP 2 503. As discussed earlier, when multiple DCIs are introduced with multiple TRPs, the UE 524 may need to the multiple DCIs, e.g., for determining ACK/NACK codebook size and providing appropriate ACK/NACK feedback for the multiple TRPs.

At 1012, the UE may determine that a joint ACK/NACK feedback can be provided for a ACK/NACK feedback instance associated with the first DCI and the second DCI. For example, with reference to FIG. 5, the UE 524 may determine that for a given ACK/NACK feedback instance, M=2. For providing ACK/NACK feedback, the UE 524 may consider one DCI from TRP 1 501 in the first slot 504, and DCIs from both TRP 1 501 and TRP 2 503 on the second slot 506. Based on the first DCI from TRP 1 501 and the second DCI from TRP 2 503 on the second slot 506, the UE 524 may determine that a joint ACK/NACK feedback can be provided for the given ACK/NACK feedback instance associated with the first DCI and the second DCI.

At 1014, the UE may determine, for the ACK/NACK feedback instance, a codebook size of the joint ACK/NACK feedback based on a number of PDCCH monitoring occasions, the first DCI and the second DCI. In some configurations, the codebook size of the joint ACK/NACK feedback may be determined based on at least one of a first DAI included in the first DCI or a second DAI included in the second DCI. Various aspects related to determining ACK/NACK codebook size have been discussed in more detailed supra in connection with FIGS. 4-10.

At 1020, the UE may receive information indicating a DAI definition for interpreting DAIs transmitted by the plurality of TRPs (e.g., in corresponding DCIs. The DAI definition may indicate whether each of the DAIs transmitted by the plurality of TRPs is a joint DAI. For example, as discussed supra in connection with FIGS. 6-7, depending on a given implementation the DAIs transmitted by the multiple TRPs may be joint DAIs or independent DAIs. A joint DAI from a TRP in a given PDCCH monitoring occasion may include a count of PDCCH grants across the plurality of TRPs and all scheduled carriers up to the given PDCCH monitoring occasion.

Figure 11:
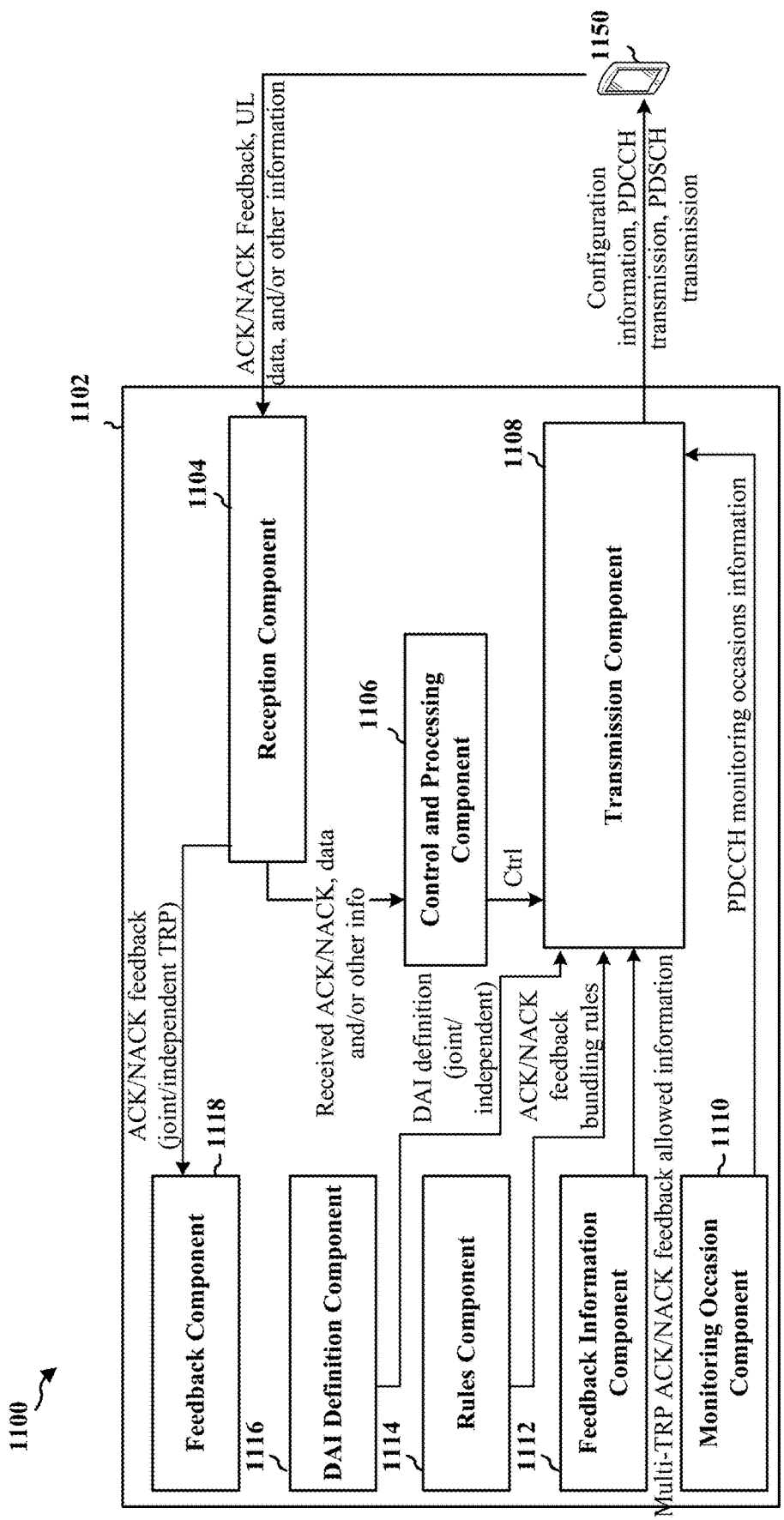
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station. In some configurations, the apparatus 1102 may be part of cell including a plurality of TRPs. The apparatus may include a reception component 1104, a control and processing component 1106, and a transmission component 1108.

The reception component 1104 may be configured to receive control information, data, and/or other information from other devices including, e.g., UE 1150 and other TRPs. The signals/information may be received by the reception component 1104 in accordance with the methods discussed supra including the method of flowchart 900. The received signals/information may be provided to one or more components of the apparatus 1102 for further processing and use in performing various operations in accordance with the methods described herein. In various configurations, the reception component 1104 may operate under the control of the control and processing component 1106.

The control and processing component 1106 may be configured to process the ACK/NACK feedback, data (e.g., uplink data from UE 1150 or other data from TRPs), and/or other received information, and use and/or provide processed (e.g., decoded and recovered information) to other components of the apparatus 1102. The control and processing component 1106 may be further configured to control the operation of the apparatus 1102, e.g., based on received information and/or the stored configuration information. For example, the control and processing component 1106 may control transmission and reception of PDCCH (e.g., DCI) and/or PDSCH (e.g., data transport blocks or CBGs) to the UE 1150. In various configurations, when a NACK feedback is received from the UE 1150, the control and processing component 1106 may control the transmission component 1108 to retransmit the data (e.g., one or more TBs) which failed decoding at the UE 1150.

The transmission component 1108 may be configured to transmit configuration information (regarding PDCCH monitoring occasions per TRP), data, control information and/or other signaling to one or more external devices including, e.g., UE 1150, and other devices such as TRPs in the cell where the apparatus 1102 is serving. In some configurations, the transmission component 1108 may function in combination with and/or under the control of the control component 1106. In some configurations, a monitoring occasion component 1110 may send, via the transmission component 1108, information indicating PDCCH monitoring occasions for each of a plurality of TRPs to the UE 1150. In some configurations, a feedback information component 1112 may send, via the transmission component 1108, information indicating whether ACK/NACK feedback across the plurality of TRPs is allowed.

In some such configurations, the apparatus may include a rules component 1114 which may be configured to send via the transmission component 1108, when ACK/NACK feedback across the plurality of TRPs is allowed, information indicating rules for performing ACK/NACK feedback bundling for providing feedback to the plurality of TRPs. In various configurations, the rules may provide information on how to perform the ACK/NACK bundling/combining at the UE. In various configurations, the ACK/NACK feedback bundling across the plurality of TRPs may allow a joint ACK/NACK feedback from the UE 1150 in response to data transmission from the plurality of TRPs to the UE.

In some such configurations, a DAI definition component 1116 may be configured to send, via the transmission component 1108, information indicating a DAI definition for interpreting DAIs transmitted by the plurality of TRPs, wherein the definition indicates whether each of the DAIs transmitted by the plurality of TRPs is a joint DAI or an independent DAI. As discussed supra, the joint DAI from a TRP in a given PDCCH monitoring occasion may include a count of PDCCH grants across the plurality of TRPs and all scheduled carriers up to the given PDCCH monitoring occasion, whereas the independent DAI from a TRP in a given PDCCH monitoring occasion may include a count of PDCCH grants from the TRP across all scheduled carriers (but not across all TRPs) up to the given PDCCH monitoring occasion.

In some configurations, a feedback component 1118 may be configured to receive, via the reception component 1104, a joint ACK/NACK feedback for the plurality of TRPs (e.g., TRPs 501 and 503) from the UE 1150 based on the rules. For example, the apparatus 1102 may be the base station 180 and the UE 1150 may be the UE 524. Via the reception component 1104, the base station 180 may receive a joint ACK/NACK from the UE 524 in accordance with the rules communicated to the UE 524 regarding bundling/combining ACK/NACK feedback for the plurality of TRPs. In one example, the feedback component 1118 may receive a joint ACK feedback from the UE 1150 (e.g., in a PUCCH or PUSCH) based on the rules. In one example, the feedback component 1118 may receive a joint NACK feedback from the UE 1150 based on the rules. The joint ACK/NACK feedback from the UE 1150 may be further based on the DAIs transmitted from the plurality of TRPs. For example, as discussed supra, to determine the ACK/NACK feedback size for the joint ACK/NACK feedback, the UE 1150 may consider the multiple DAIs (in corresponding DCIs) transmitted from the multiple TRPs.

In some configurations, the feedback component 1118 may be configured to receive multiple ACK/NACK feedback from the UE 1150 in a PUCCH for the first TRP independently from the second TRP. In accordance with one aspect, rather than receiving a joint PUCCH, the base station 180 may receive an individual PUCCH from the UE 524. For example, referring to FIG. 8, a UE 804 may transmit individual PUCCHs to multiple TRPs including TRP 1 801 and TRP 2 802. As illustrated, in one example, the UE 804 may transmit a first PUCCH (e.g., PUCCH 1 806) to TRP 1 802, and a second PUCCH (e.g., PUCCH 2 808) to TRP 2 803.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
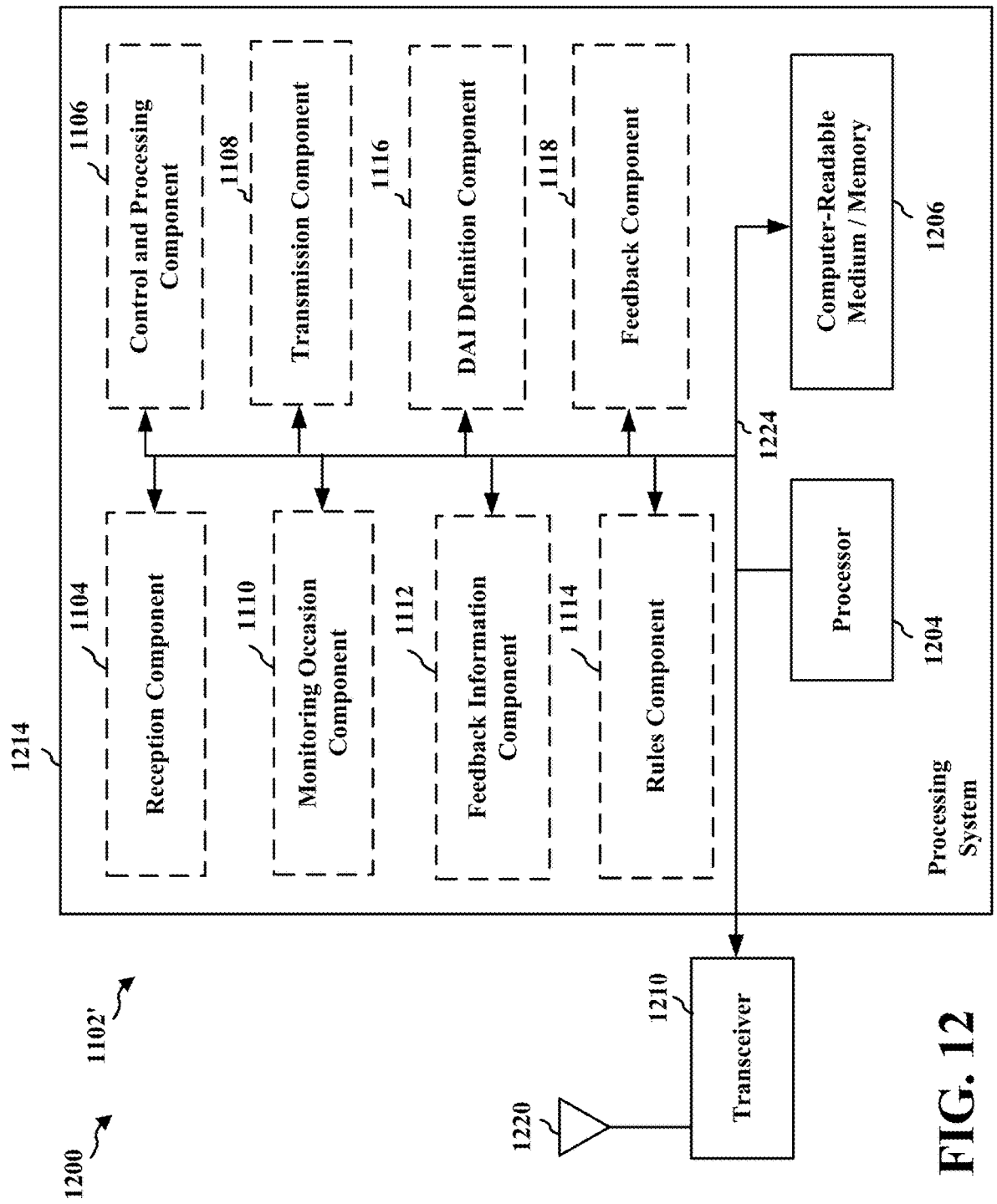
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, and 1118 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, and 1118. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for sending, to a user equipment (UE), information indicating PDCCH monitoring occasions for each of the plurality of TRPs, and for sending information indicating whether ACK/NACK feedback across the plurality of TRPs is allowed. In some configurations, the apparatus 1102/1102' may further include means for storing information, e.g., information such as ACK/NACK, data or other information received from UEs, information acquired from other TRPs, information generated by the apparatus 1102/1102', e.g., for transmission to UE 1150 and/or other devices.

In one configuration, the means for sending may be further configured to send, when ACK/NACK feedback across the plurality of TRPs is allowed, information indicating rules for performing ACK/NACK feedback bundling for providing feedback to the plurality of TRPs. In one configuration, the means for sending may be further configured to send information indicating a DAI definition for interpreting DAIs transmitted by the plurality of TRPs in corresponding PDCCH transmissions, wherein the DAI definition may indicate whether each of the DAIs transmitted by the plurality of TRPs is a joint DAI or an independent DAI.

In one configuration, the apparatus may further comprise means for receiving a joint ACK/NACK feedback from the UE, e.g., in a PUCCH or PUSCH, based on the rules. In some configurations, the means for receiving may be configured to receive a joint ACK feedback from the UE based on the rules. In one configuration, the means for receiving may be configured to receive a joint NACK feedback from the UE based on the rules.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
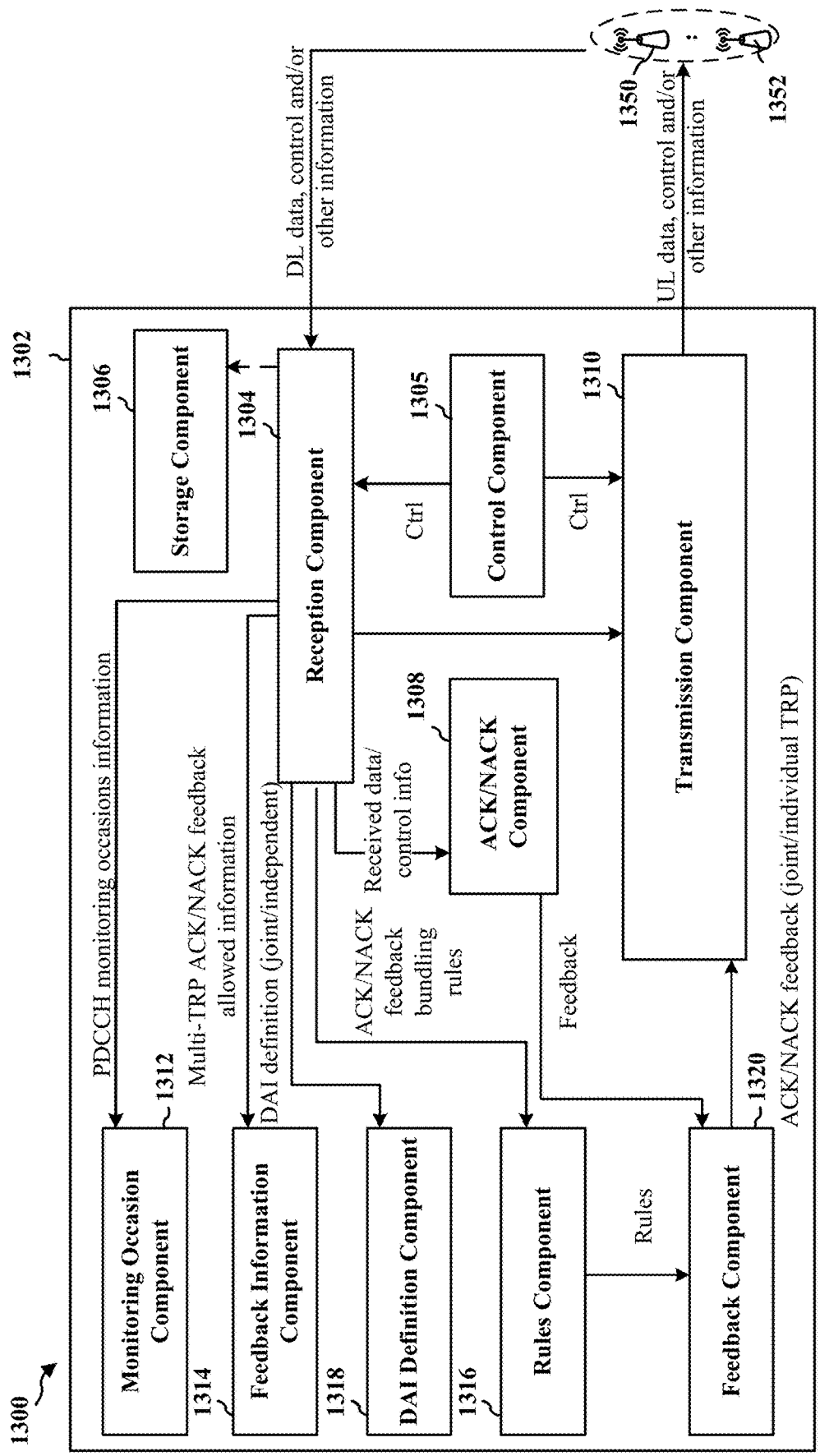
FIG. 13 is a conceptual data flow diagram illustrating the data flow between different means/components in another exemplary apparatus.

FIG. 13 is a conceptual data flow diagram 1300 illustrating the data flow between different means/components in an exemplary apparatus 1302. The apparatus may be a UE. In some configurations, the apparatus 1302 may be part of a network including multiple TRPs such as TRPs 1350 and 1352. The apparatus includes a reception component 1304, a control component 1305, a storage component 1306, an ACK/NACK component 1308, and a transmission component 1310.

The reception component 1304 may be configured to receive configuration information, data, and/or other information from external devices including TRPs 1350 and 1350 and/or a serving base station (such as base station 102/180) which may also be one of the multiple TRPs. The signals/information may be received by the reception component 1304 in accordance with the methods discussed supra including the method of flowchart 1000. The received signals/information may be provided to one or more components of the apparatus 1302 for further processing and use in performing various operations. In various configurations, the reception component 1304 may operate under the control of the control component 1305. In some configurations, a monitoring occasion component 1312 may receive, via the reception component 1304, information indicating PDCCH monitoring occasions for each of a plurality of TRPs (e.g., TRP 1350, and TRP 1352). In some configurations, a feedback information component 1314 may further receive, via the reception component 1304, information indicating whether ACK/NACK feedback across the plurality of TRPs is allowed. In one configuration, a rules component 1316 may be configured to receive (e.g., when ACK/NACK feedback across the plurality of TRPs is allowed), via the reception component 1304, information indicating rules for performing ACK/NACK feedback bundling at the UE for providing feedback to the plurality of TRPs.

In some configurations, a DAI definition component 1318 may be configured to receive, via the reception component 1304, information indicating a DAI definition for interpreting DAIs transmitted by the plurality of TRPs in corresponding DCIs, wherein the definition may indicate whether each of the DAIs transmitted by the plurality of TRPs is a joint DAI or an independent DAI. In some configurations, reception component 1304 may be further configured to receive PDCCH transmissions (including respective DCIs) from various TRPs. For example, the reception component 1304 may receive a first DCI from a first TRP (e.g., TRP 1350) and a second DCI from a second TRP (e.g., TRP 1352).

In some configurations, reception component 1304 may provide the received information, e.g., received rules, information on whether ACK/NACK bundling is allowed and/or other information to the storage component 1306 and/or the ACK/NACK component 1308 and/or other components, for use in controlling the operation of the apparatus 1302 in accordance with the features of the methods presented herein. In some configurations, the reception component 1304 includes a decoding component configured to decode data (e.g., received in a PDSCH) from one or more of the multiple TRPs. In some configurations, the result of decoding may be may be provided to the ACK/NACK component 1308. In some configurations, based on an input from the reception component 1304 indicating whether the decoding is successful or unsuccessful, the ACK/NACK component 1308 may generate an ACK or NACK feedback signal.

The ACK/NACK component 1308 may be configured to generate ACK/NACK feedback signal. In one configuration, the ACK/NACK component 1308 may be configured to determine that a joint ACK/NACK feedback may be provided for a ACK/NACK feedback instance associated with the received first DCI and the second DCI. In one configuration, the ACK/NACK component 1308 may be further configured to determine, for the ACK/NACK feedback instance, a codebook size of the joint ACK/NACK feedback based on a number of PDCCH monitoring occasions, the first DCI and the second DCI. In some configurations, the ACK/NACK component 1308 may determine the codebook size of the joint ACK/NACK feedback based on at least one of a first DAI included in the first DCI or a second DAI included in the second DCI. In various configurations, the ACK/NACK component 1308 may determine the ACK/NACK codebook size in accordance with the features described above. In some configurations, when ACK/NACK bundling is allowed, the ACK/NACK component 1308 may be configured to generate a joint/combined ACK/NACK feedback signal as a feedback for the plurality of TRPs (e.g., for the first and second TRPs). In some configurations, the ACK/NACK component 1308 may generate a joint ACK/NACK feedback based on the indicated rules and the determined codebook size.

In some configurations, the transmission component 1310 may be configured to transmit ACK/NACK feedback signals, data, and/or other signaling to one or more external devices including, e.g., the TRPs 1350 and 1352. In some configurations, the transmission component may function in combination with and/or under the control of the control component 1305. For example, the control component 1305 may control the transmission component 1310 to send ACK/NACK feedback in accordance with the rules and in accordance with an appropriate transmission schedule.

In some configurations, a feedback component 1320 may be configured to transmit, via the transmission component 1310, the joint ACK/NACK feedback having the determined codebook size, e.g., in a PUCCH or PUSCH, based on the rules.

In some configurations, the rules may indicate that a joint ACK feedback is to be provided for the first TRP and the second TRP upon successful reception of data by the UE from at least one of the first TRP or the second TRP. In one such configuration, the feedback component 1320 may be configured to transmit, via the transmission component 1310, a joint ACK feedback when the UE successfully receives data from at least one of the first TRP or the second TRP. In some configurations, the rules may further indicate that a joint NACK feedback is to be provided for the first TRP and the second TRP when the UE fails to successfully receive data from both the first TRP and the second TRP. In one such configuration, the feedback component 1320 may be configured to transmit, via the transmission component 1310, a joint NACK feedback when the UE fails to successfully receive data from both the first TRP and the second TRP.

In some configurations, the rules may indicate that a joint NACK feedback is to be provided for the first TRP and the second TRP when the UE fails to successfully receive data from at least one of the first TRP or the second TRP. In one such configuration, the feedback component 1320 may be configured to transmit, via the transmission component 1310, a joint NACK feedback when the UE fails to successfully receive data from at least one of the first TRP or the second TRP. In some such configurations, the feedback component 1320 may be configured to transmit, via the transmission component 1310, a joint ACK feedback when the UE successfully receives data from both the first TRP and the second TRP.

In some configurations, the feedback component 1320 may be configured to determine that multiple ACK/NACK feedback may be provided by the transmission component 1310 in a PUCCH individually to the first TRP and to the second TRP. In accordance with one aspect, rather than transmitting a joint PUCCH, the feedback component 1320 may be configured to transmit, via the transmission component 1310, an individual PUCCH to each TRP. In some configurations, the multiple PUCCHs may be transmitted at different times, e.g., in a TDM manner. In some other configurations, the multiple PUCCHs may be transmitted concurrently on different PUCCH resources. In yet another configuration, the multiple PUCCHs may be transmitted concurrently from multiple UL TRPs. For example, multiple UL TRPs may be multiple antenna arrays/beams, and each of the antenna arrays/beams (UL TRP) may transmit a PUCCH concurrently.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
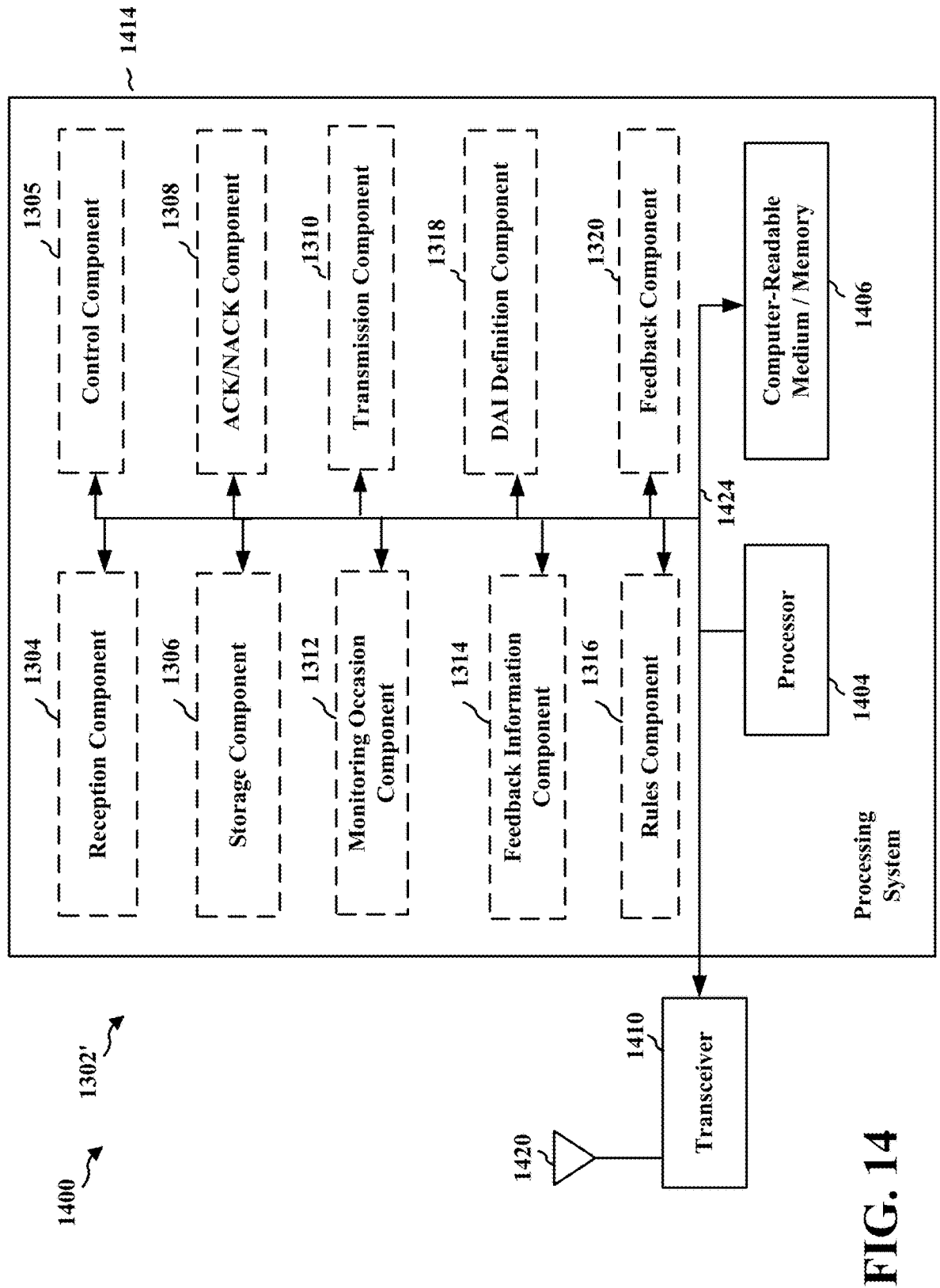
FIG. 14 is a diagram illustrating an example of a hardware implementation for another apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1305, 1306, 1308, 1310, 1312, 1314, 1316, 1318, 1320 and the computer-readable medium/ memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1305, 1306, 1308, 1310, 1312, 1314, 1316, 1318, and 1320. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving information indicating PDCCH monitoring occasions for each of a plurality of TRPs. The means for receiving may be further configured to receive information indicating whether ACK/ NACK feedback across the plurality of TRPs is allowed. In some configurations, the means for receiving may be further configured to receive, when ACK/NACK feedback across the plurality of TRPs is allowed, information indicating rules for performing ACK/NACK feedback bundling at the UE for providing feedback to the plurality of TRPs. In some configurations, the means for receiving may be further configured to receive a first DCI from the first TRP and a second DCI from the second TRP. In some configurations, the means for receiving may be further configured to receive information indicating a DAI definition for interpreting DAIs transmitted by the plurality of TRPs in corresponding DCIs, wherein the definition may indicate whether each of the DAIs transmitted by the plurality of TRPs is a joint DAI or an independent DAI. In some configurations, the apparatus 1302/1302' may further include means for storing information, e.g., received information from other devices, and/or information generated by the apparatus 1302.

In some configurations, the apparatus 1302/1302' may further include means for determining that a joint ACK/ NACK feedback can be provided for a ACK/NACK feedback instance associated with the first DCI and the second DCI. The means for determining may be further configured to determine, for the ACK/NACK feedback instance, a codebook size of the joint ACK/NACK feedback based on a number of PDCCH monitoring occasions, the first DCI and the second DCI. In some configurations, the means for determining may be configured to determine the codebook size of the joint ACK/NACK feedback based on at least one of a first DAI included in the first DCI or a second DAI included in the second DCI.

In some configurations, the apparatus 1302/1302' may further include means for transmitting the joint ACK/NACK feedback having the determined codebook size in a physical uplink control channel (PUCCH) based on the rules.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station of a cell including a plurality of transmission reception points (TRPs), comprising:
   sending, to a user equipment (UE), information indicating physical downlink control channel (PDCCH) monitoring occasions for each of the plurality of TRPs;
   sending, to the user equipment (UE), information indicating whether acknowledgment (ACK)/negative ACK (NACK) feedback across the plurality of TRPs is allowed; and
   receiving a ACK/NACK feedback across the plurality of TRPs, in response to data transmission to the UE, wherein a codebook size of the ACK/NACK feedback across the plurality of TRPs is based on the PDCCH monitoring occasions, wherein the ACK/NACK feedback is associated with a plurality of DCIs sent by the plurality of TRPs.

2. The method of claim 1, further comprising:
   sending, when ACK/NACK feedback across the plurality of TRPs is allowed, information indicating rules for performing ACK/NACK feedback bundling for providing ACK/NACK feedback to the plurality of TRPs;
   wherein the ACK/NACK feedback across the plurality of TRPs allows a joint ACK/NACK feedback from the UE in response to data transmission from the plurality of TRPs to the UE.

3. The method of claim 1, further comprising:
   sending information indicating a downlink assignment index (DAI) definition for interpreting DAIs transmitted by the plurality of TRPs in corresponding PDCCH transmissions, wherein the DAI definition indicates whether each of the DAIs transmitted by the plurality of TRPs is an independent DAI;
   wherein the independent DAI from a TRP in a given PDCCH monitoring occasion includes a count of PDCCH grants from the TRP across all scheduled carriers up to the given PDCCH monitoring occasion.

4. The method of claim 2, wherein the base station is a first TRP and a second TRP is a second base station, the method further comprising:
   receiving the joint ACK/NACK feedback from the UE in a physical uplink control channel (PUCCH) based on the rules.

5. The method of claim 1, wherein the plurality of TRPs include a first TRP and second TRP, wherein the base station is the first TRP and the second TRP is a second base station, the method further comprising:
   receiving multiple ACK/NACK feedback from the UE in a physical uplink control channel (PUCCH) for the first TRP independent from the second TRP.

6. The method of claim 2, wherein the plurality of TRPs include a first TRP and a second TRP, and wherein the rules indicate that a joint ACK feedback is to be provided as a feedback for the first TRP and the second TRP upon successful reception of data by the UE from at least one of the first TRP or the second TRP;
   wherein the rules further indicate that a joint NACK feedback is to be provided as the feedback for the first TRP and the second TRP when the UE fails to successfully receive data from both the first TRP and the second TRP.

7. The method of claim 2, wherein the plurality of TRPs include a first TRP and a second TRP, and wherein the rules indicate that a joint NACK feedback is to be provided as a feedback for the first TRP and the second TRP when the UE fails to successfully receive data from at least one of the first TRP or the second TRP;
   wherein the rules further indicate that a joint ACK feedback is to be provided as the feedback for the first TRP and the second TRP when the UE successfully receives data from both the first TRP or the second TRP.

8. The method of claim 1, further comprising:
   sending information indicating a downlink assignment index (DAI) definition for interpreting DAIs transmitted by the plurality of TRPs in corresponding PDCCH transmissions, wherein the DAI definition indicates whether each of the DAIs transmitted by the plurality of TRPs is a joint DAI; and
   wherein the joint DAI from a TRP in a given PDCCH monitoring occasion includes a count of PDCCH grants across the plurality of TRPs and all scheduled carriers up to the given PDCCH monitoring occasion.

9. A base station of a cell including a plurality of transmission reception points (TRPs), comprising:
   a memory; and
   at least one processor coupled to the memory and configured to:

send, to a user equipment (UE), information indicating physical downlink control channel (PDCCH) monitoring occasions for each of the plurality of TRPs;
send, to the user equipment (UE), information indicating whether acknowledgment (ACK)/negative ACK (NACK) feedback across the plurality of TRPs is allowed; and
receive a ACK/NACK feedback across the plurality of TRPs, in response to data transmission to the UE, wherein a codebook size of the ACK/NACK feedback across the plurality of TRPs is based on the PDCCH monitoring occasions, wherein the ACK/NACK feedback is associated with a plurality of DCIs sent by the plurality of TRPs.

10. The base station of claim 9, wherein the at least one processor is further configured to:
send, when ACK/NACK feedback across the plurality of TRPs is allowed, information indicating rules for performing ACK/NACK feedback bundling for providing ACK/NACK feedback to the plurality of TRPs;
wherein the ACK/NACK feedback across the plurality of TRPs allows a joint ACK/NACK feedback from the UE in response to data transmission from the plurality of TRPs to the UE.

11. The base station of claim 9, wherein the at least one processor is further configured to:
send information indicating a downlink assignment index (DAI) definition for interpreting DAIs transmitted by the plurality of TRPs in corresponding PDCCH transmissions, wherein the DAI definition indicates whether each of the DAIs transmitted by the plurality of TRPs is an independent DAI;
wherein the independent DAI from a TRP in a given PDCCH monitoring occasion includes a count of PDCCH grants from the TRP across all scheduled carriers up to the given PDCCH monitoring occasion.

12. The base station of claim 10, wherein the base station is a first TRP and a second TRP is a second base station, and wherein the at least one processor is further configured to:
receive the joint ACK/NACK feedback from the UE in a physical uplink control channel (PUCCH) based on the rules.

13. The base station of claim 9, wherein the plurality of TRPs include a first TRP and a second TRP, wherein the base station is the first TRP and the second TRP is a second base station, and wherein the at least one processor is further configured to:
receive multiple ACK/NACK feedback from the UE in a physical uplink control channel (PUCCH) for the first TRP independent from the second TRP.

14. The base station of claim 10, wherein the plurality of TRPs include a first TRP and a second TRP, and wherein the rules indicate that a joint ACK feedback is to be provided as a feedback for the first TRP and the second TRP upon successful reception of data by the UE from at least one of the first TRP or the second TRP;
wherein the rules further indicate that a joint NACK feedback is to be provided as the feedback for the first TRP and the second TRP when the UE fails to successfully receive data from both the first TRP and the second TRP.

15. The base station of claim 10, wherein the plurality of TRPs include a first TRP and a second TRP, and wherein the rules indicate that a joint NACK feedback is to be provided as a feedback for the first TRP and the second TRP when the UE fails to successfully receive data from at least one of the first TRP or the second TRP;
wherein the rules further indicate that a joint ACK feedback is to be provided as the feedback for the first TRP and the second TRP when the UE successfully receives data from both the first TRP or the second TRP.

16. The base station of claim 9, wherein the at least one processor is further configured to:
send information indicating a downlink assignment index (DAI) definition for interpreting DAIs transmitted by the plurality of TRPs in corresponding PDCCH transmissions, wherein the DAI definition indicates whether each of the DAIs transmitted by the plurality of TRPs is a joint DAI; and
wherein the joint DAI from a TRP in a given PDCCH monitoring occasion includes a count of PDCCH grants across the plurality of TRPs and all scheduled carriers up to the given PDCCH monitoring occasion.

17. A method of wireless communication of a user equipment (UE), comprising:
receiving information indicating physical downlink control channel (PDCCH) monitoring occasions for each of a plurality of transmission reception points (TRPs);
receiving information indicating whether acknowledgment (ACK)/negative ACK (NACK) feedback across the plurality of TRPs is allowed;
receiving a plurality of DCIs from the plurality of TRPs; and
determining a codebook size of a ACK/NACK feedback across the plurality of TRPs, associated with the plurality of DCIs, based on the PDCCH monitoring occasions.

18. The method of claim 17, further comprising:
receiving, when ACK/NACK feedback across the plurality of TRPs is allowed, information indicating rules for performing ACK/NACK feedback bundling at the UE for providing ACK/NACK feedback to the plurality of TRPs;
wherein the ACK/NACK feedback across the plurality of TRPs allows a joint ACK/NACK feedback from the UE in response to data transmission from the plurality of TRPs to the UE.

19. The method of claim 17, further comprising:
receiving information indicating a downlink assignment index (DAI) definition for interpreting DAIs transmitted by the plurality of TRPs in corresponding DCIs, wherein the DAI definition indicates whether each of the DAIs transmitted by the plurality of TRPs is an independent DAI;
wherein the independent DAI from a TRP in a given PDCCH monitoring occasion includes a count of PDCCH grants from the TRP across all scheduled carriers up to the given PDCCH monitoring occasion.

20. The method of claim 18, wherein the plurality of TRPs include a first TRP and a second TRP, the method further comprising:
receiving a first DCI from the first TRP and a second DCI from the second TRP;
determining that the joint ACK/NACK feedback can be provided for a ACK/NACK feedback instance associated with the first DCI and the second DCI;
determining, for the ACK/NACK feedback instance, a codebook size of the joint ACK/NACK feedback based on a number of PDCCH monitoring occasions, the first DCI and the second DCI; and
transmitting the joint ACK/NACK feedback having the determined codebook size in a physical uplink control channel (PUCCH) based on the rules.

21. The method of claim 17, wherein the plurality of TRPs include a first TRP and a second TRP, the method further comprising:
transmitting multiple ACK/NACK feedback in a physical uplink control channel (PUCCH) individually to the first TRP and to the second TRP.

22. The method of claim 20, wherein the codebook size of the joint ACK/NACK feedback is determined based on at least one of a first DAI included in the first DCI or a second DAI included in the second DCI.

23. The method of claim 17, further comprising:
receiving information indicating a downlink assignment index (DAI) definition for interpreting DAIs transmitted by the plurality of TRPs in corresponding DCIs, wherein the DAI definition indicates whether each of the DAIs transmitted by the plurality of TRPs is a joint DAI;
wherein the joint DAI from a TRP in a given PDCCH monitoring occasion includes a count of PDCCH grants across the plurality of TRPs and all scheduled carriers up to the given PDCCH monitoring occasion.

24. The method of claim 20, wherein the rules indicate that a joint ACK feedback is to be provided for the first TRP and the second TRP upon successful reception of data by the UE from at least one of the first TRP or the second TRP, and
wherein the joint ACK/NACK feedback transmitted based on the rules is the joint ACK feedback when the UE successfully receives data from at least one of the first TRP or the second TRP;
wherein the rules further indicate that a joint NACK feedback is to be provided for the first TRP and the second TRP when the UE fails to successfully receive data from both the first TRP and the second TRP, and
wherein the joint ACK/NACK feedback transmitted based on the rules is the joint NACK feedback when the UE fails to successfully receive data from both the first TRP and the second TRP.

25. The method of claim 20, wherein the rules indicate that a joint NACK feedback is to be provided for the first TRP and the second TRP when the UE fails to successfully receive data from at least one of the first TRP or the second TRP, and
wherein the joint ACK/NACK feedback transmitted based on the rules is the joint NACK feedback when the UE fails to successfully receive data from at least one of the first TRP or the second TRP;
wherein the rules further indicate that a joint ACK feedback is to be provided for the first TRP and the second TRP when the UE successfully receives data from both the first TRP or the second TRP, and
wherein the joint ACK/NACK feedback transmitted based on the rules is the joint ACK feedback when the UE successfully receives data from both the first TRP and the second TRP.

26. A user equipment (UE) for wireless communication, comprising:
a memory; and
at least one processor coupled to the memory and configured to:
receive information indicating physical downlink control channel (PDCCH) monitoring occasions for each of a plurality of transmission reception points (TRPs);
receive information indicating whether acknowledgment (ACK)/negative ACK (NACK) feedback across the plurality of TRPs is allowed;
receive a plurality of DCIs from the plurality of TRPs; and
determine a codebook size of a ACK/NACK feedback across the plurality of TRPs, associated with the plurality of DCIs, based on the PDCCH monitoring occasions.

27. The UE of claim 26, wherein the at least one processor is further configured to:
receive, when ACK/NACK feedback across the plurality of TRPs is allowed, information indicating rules for performing ACK/NACK feedback bundling for providing ACK/NACK feedback to the plurality of TRPs;
wherein the ACK/NACK feedback across the plurality of TRPs allows a joint ACK/NACK feedback from the UE in response to data transmission from the plurality of TRPs to the UE.

28. The UE of claim 26, wherein the at least one processor is further configured to:
receive information indicating a downlink assignment index (DAI) definition for interpreting DAIs transmitted by the plurality of TRPs in corresponding PDCCH transmissions, wherein the DAI definition indicates whether each of the DAIs transmitted by the plurality of TRPs is an independent DAI;
wherein the independent DAI from a TRP in a given PDCCH monitoring occasion includes a count of PDCCH grants from the TRP across all scheduled carriers up to the given PDCCH monitoring occasion.

29. The UE of claim 27, wherein the plurality of TRPs include a first TRP and a second TRP, and wherein the at least one processor is further configured to:
receive a first DCI from the first TRP and a second DCI from the second TRP;
determine that the joint ACK/NACK feedback can be provided for a ACK/NACK feedback instance associated with the first DCI and the second DCI;
determine, for the ACK/NACK feedback instance, a codebook size of the joint ACK/NACK feedback based on a number of PDCCH monitoring occasions, the first DCI and the second DCI; and
transmit the joint ACK/NACK feedback having the determined codebook size in a physical uplink control channel (PUCCH) based on the rules.

30. The UE of claim 26, wherein the plurality of TRPs include a first TRP and a second TRP, and wherein the at least one processor is further configured to:
transmit multiple ACK/NACK feedback in a physical uplink control channel (PUCCH) individually to the first TRP and to the second TRP.

* * * * *